United States Patent
Pearce et al.

(10) Patent No.: US 7,460,471 B2
(45) Date of Patent: Dec. 2, 2008

(54) SYSTEM FOR MOTION CONTROL, METHOD OF USING THE SYSTEM FOR MOTION CONTROL, AND COMPUTER READABLE INSTRUCTIONS FOR USE WITH THE SYSTEM FOR MOTION CONTROL

(75) Inventors: Robert Pearce, Bristol (GB); David Cline, Santa Barbara, CA (US)

(73) Assignee: Motion Engineering, Inc., Santa Barbara, CA (US)

( * ) Notice: Subject to any disclaimer, the term of this patent is extended or adjusted under 35 U.S.C. 154(b) by 77 days.

(21) Appl. No.: 11/501,737

(22) Filed: Aug. 10, 2006

(65) Prior Publication Data

US 2006/0276913 A1  Dec. 7, 2006

Related U.S. Application Data

(60) Division of application No. 11/120,207, filed on May 3, 2005, now Pat. No. 7,143,301, which is a continuation of application No. 09/779,834, filed on Feb. 9, 2001, now Pat. No. 7,024,257.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 370/226; 370/221; 370/222; 370/223; 370/224; 370/225

(58) Field of Classification Search .......... 370/221–226
See application file for complete search history.

(56) References Cited

U.S. PATENT DOCUMENTS 4,214,823 A    7/1980  Pritchard (Continued)

FOREIGN PATENT DOCUMENTS

DE         198 08 103 A1    9/1999

(Continued)

OTHER PUBLICATIONS

Fiber Distributed Data Interface (FDDI); Cisco Documentation; 9 pages.*

(Continued)

*Primary Examiner*—Ronald D Hartman, Jr.
(74) *Attorney, Agent, or Firm*—Oblon, Spivak, McClelland, Maier & Neustadt, P.C.

(57) ABSTRACT

A motion control system and method that includes a central controller configured to generate first and second demand control signals to be used to define actuation motion of respective first and second actuators. The central controller is in communication with first and second nodes by way of a data network, each node including at least a respective actuator configured to implement at an actuator time a motion or force-related effort based upon the respective demand control signal. Each node also includes a memory configured to store at least one respective propagation delay parameter related to a signal propagation delay between the central controller and the node. A timing mechanism establishes timing at each node based on the respective propagation delay parameter so that the actuator time at the nodes occurs simultaneously. Strictly cyclic and/or full-duplex high-speed communication can be supported. The network can be wired in a ring or as a tree and with twisted pair cabling or fiber. The central controller issues demand signals to the nodes that are actuator, servo motor drive, and/or I/O devices. The central controller can also provide a timing message that is used by the nodes, in conjunction with local delay correction circuitry, so that the simultaneous acquisition of data and the simultaneous implementation of controlled action occur.

4 Claims, 24 Drawing Sheets

U.S. PATENT DOCUMENTS

| | | |
|---|---|---|
| 4,262,336 A | 4/1981 | Pritchard |
| 4,449,196 A | 5/1984 | Pritchard |
| 5,361,277 A | 11/1994 | Grover |
| 5,555,438 A | 9/1996 | Blech et al. |
| 5,821,666 A | 10/1998 | Matsumoto et al. |
| 5,914,963 A | 6/1999 | Basile |
| 6,112,308 A | 8/2000 | Self et al. |
| 6,185,217 B1 | 2/2001 | Ando et al. |
| 6,718,476 B1 | 4/2004 | Shima |
| 6,918,047 B1 | 7/2005 | Sita et al. |
| 6,943,610 B2 | 9/2005 | Saint-Laurent |
| 2001/0024455 A1 | 9/2001 | Thaler et al. |
| 2002/0031199 A1 | 3/2002 | Rolston et al. |
| 2004/0064750 A1 | 4/2004 | Conway |
| 2006/0129776 A1 | 6/2006 | Ware et al. |

FOREIGN PATENT DOCUMENTS

| | | |
|---|---|---|
| JP | 6-43937 | 2/1994 |
| JP | 8-76822 | 3/1996 |
| JP | 9-69481 | 3/1997 |
| JP | 11-95842 | 4/1999 |
| JP | 11-509387 | 8/1999 |
| JP | 2000-35806 | 2/2000 |
| JP | 2000-132428 | 5/2000 |
| JP | 2000-151667 | 5/2000 |
| JP | 2000-339024 | 12/2000 |
| WO | WO 97/04512 | 2/1997 |

OTHER PUBLICATIONS

Network Topology; Wikipedia; 12 pages.*
Overview: PA-F/FD-SM and PA-F/FD-MM Full-Duplex FDDI Port Adapter Installation and Configuration; Cisco documentation; 11 pages.*
End of Sale Announcement for PA-F-SM and PA-F-MM; Cisco documentation; 3 pages.*
Welcome—FDDI Frequently Asked Questions (FAQ); 12 pages.*
Notice Requesting Submission of Opinion from the Korean Patent Office (7 pages). This reference was submitted by the applicant on May 5, 2008 w/o a corresponding PTO 1449.*
Fiber Distributed Data Interface (FDDI); Cisco Documentation; 9 pages; Oct. 12, 2006.*
Network Topology; Wikipedia; 12 pages; Dec. 31, 2006.*
Overview: PA-F/FD-SM and PA-F/FD-MM Full-Duplex FDDI Port Adapter Installation and Configuration; Cisco documentation; 11 pages; circa 2001.*
End of Sale Announcement for PA-F-SM and PA-F-MM; Cisco documentation; 3 pages; circa 2001.*
Welcome—FDDI Frequently Asked Questions (FAQ); 12 pages; circa 2001.*
Allen-Bradley Company, Inc., Offline Development System (ODS), Publication 8520-UM051A-EN-P, User Manual, the entire book, Oct. 2000.
U.S. Appl. No. 11/501,728, filed Aug. 10, 2006, Pearce, et al.
U.S. Appl. No. 11/501,736, filed Aug. 10, 2006, Pearce, et al.
U.S. Appl. No. 11/501,737, filed Aug. 10, 2006, Pearce, et al.
Ivana Milosavljevic, et al., "Analysis of Converter Operation with Phase-Leg Control in Daisy-Chained or Ring-Type Structure", Power Electronics Specialists Conference, vol. 2, XP-010346769, Jun. 27, 1999, pp. 1216-1221.
Ralph Kennel, et al., "Data Communication by Sercos interface", Automatisierungstechnische Praxis, vol. 33, No. 7, XP-000243095, Jul. 1, 1991, pp. 363-368.
Kouhei Ohnishi et al., "Motion Control for Advanced Mechatronics", IEEE/ASME Transactions on Mechatronics, vol. 1, No. 1, pp. 56-67, Mar. 1996.

* cited by examiner

| Telegram type | Name | Address mode | Valid during discovery or operational phase ? |
|---|---|---|---|
| MST | Master synchronization telegram | Broadcast | OP |
| MDT | Master data telegram | Destination | OP |
| MQT | Master query telegram | Broadcast | DP |
| MPT | Master port telegram | Destination | DP |
| MAT | Master assignment telegram | Broadcast | DP |
| MTT | Master tail telegram | Broadcast | OP |
| MCT | Master configuration telegram | Destination | DP |
| MHT | Master hide telegram | Broadcast | DP, OP |
| AAT | Amplifier answer telegram | Source | DP |
| AT | Amplifier telegram | Source | OP |

FIG. 5

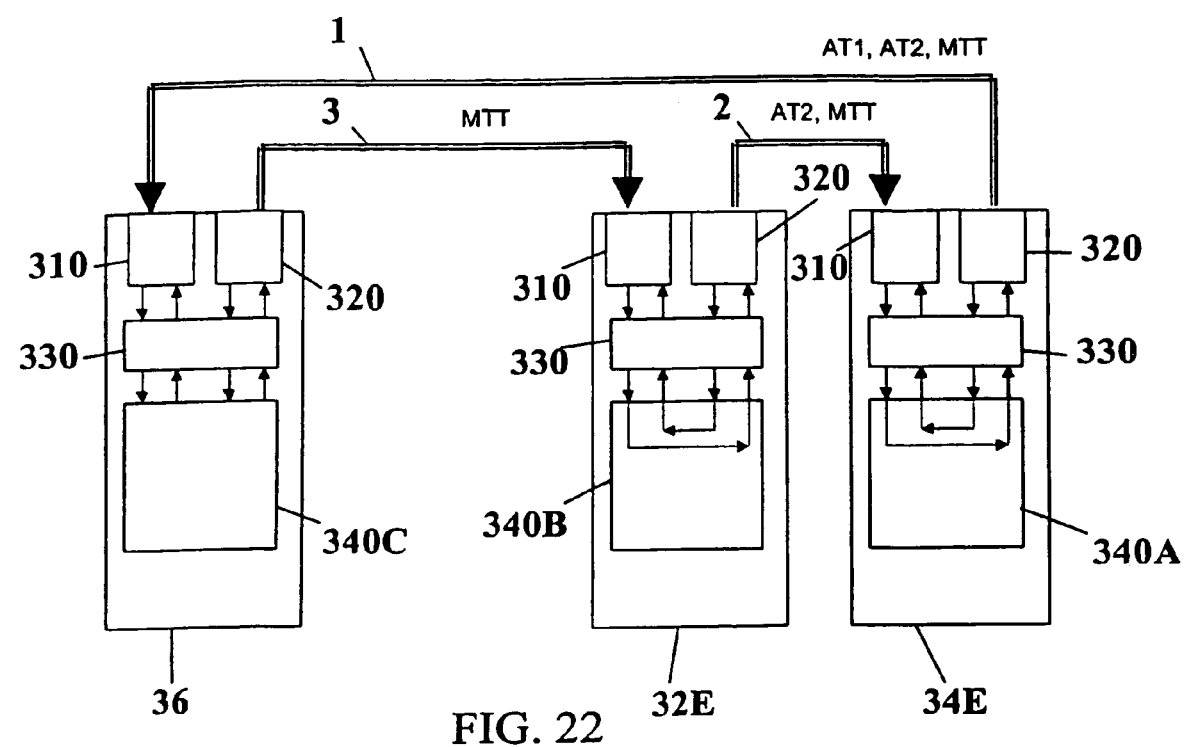
FIG. 22

SYSTEM FOR MOTION CONTROL, METHOD OF USING THE SYSTEM FOR MOTION CONTROL, AND COMPUTER READABLE INSTRUCTIONS FOR USE WITH THE SYSTEM FOR MOTION CONTROL

CROSS-REFERENCE TO RELATED APPLICATIONS

This application is a divisional of U.S. patent application Ser. No. 11/120,207, filed May 3, 2005, which is a continuation of U.S. Pat. No. 7,024,257, issued Apr. 4, 2006, the entire contents of each of which are hereby incorporated herein by reference.

BACKGROUND OF THE INVENTION

1. Field of the Invention

This invention relates to the control of motion of complex machines, and specifically to an improved system, method, and computer-readable instructions designed to minimize wiring yet retain the flexibility of centralized control systems.

2. Discussion of the Background

The control of moving components in modern manufacturing equipment, such as the equipment used to process and package semiconductor devices, has become extremely complex as demands for both speed and precision increase. Such complexity is seen, for example, in the implementation of feedback control loops used in servo motion control systems. These servo control systems are used for critical positioning actuators, typically referred to as motion axes, in a complex machine.

A schematic representation of an exemplary basic servo axis motion control system 10 is shown in FIG. 1. Typically, a desired motion path profile is generated at a motion planning device 12, either prior to operation or in response to a system stimulus. The desired motion profile is converted to a motor signal (or other actuator signal) by the drive 16. The drive 16 is typically a combination analog or pulse width modulated (PWM) amplifier along with the digital circuitry needed to convert a digital motion profile into the analog actuator drive signals.

The desired motion path profile can be described and regulated in several ways. For example, a "demanded position" is the desired motion profile expressed in terms of the position of the actuator (and/or actuated object). Alternatively, the "demanded velocity" of the actuator and/or actuated object may be used, as well as a combination of velocity and position. A position measuring device, typically an optical motion encoder, is used to measure the "actual motion path profile" (e.g., the "actual position" and/or "actual velocity") of either the shaft of the motor 15, or for more precise systems, the actual moving part position.

Due to various mechanical and electrical sources of error (such as, e.g., noise, backlash, part flexing), a difference between the desired motion profile and the actual motion profile is often present. For example, PID (Proportional Integral Differential) feedback 120 in the position/velocity loop can be used to adjust the drive signal to minimize the error between demand and actual position. The algorithms in many high performance servo motion systems go well beyond PID control. Servo systems often include filters to compensate for mechanical resonances, tailored acceleration/deceleration profiles, and other software intensive control elements that help optimize the speed and accuracy of a moving system.

The control signal input to the drive 16 is usually a voltage, whereas most motors generate a torque that is proportional to an input current. Therefore, the drive 16 must often convert the input voltage representing the desired position and/or velocity to a current corresponding to the motor torque. This voltage-to-current conversion requires another feedback element, the current loop 110, which may range from a simple wire between the input and output of a linear amplifier to fairly complex digital logic controls in the case of PWM amplifiers.

Modern motion control systems may include several elements (e.g. actuators) that need to operate simultaneously to perform complex tasks. In other words, a motion control system may include several servo motors 18 (or other actuators) and therefore several axes of control. The decisions about when and where to move using which trajectory are termed "motion planning." The motion control system also includes a cascade control scheme for each axis, where the elements in the cascade include the current/torque control loop, and the position and/or velocity control loop, which may either be combined or separate parts of the cascade.

Several types of digital networks have been indicated for use in motion control. These networks can be divided up into two groups: those that have been designed for general purpose data transmission but then applied to motion control and those that are designed specifically for use as motion control networks.

1. General Purpose Networks

These are generally networks designed for data communications or multi-media applications and adapted to machine control. Data communications networks are directed to moving data from point to point in an efficient and reliable manner but they pay little or no attention to the timeliness of delivery. For example, multi-media networks stream data at 8 kHz from a CD player to an audio amplifier. Although multi-media networks guarantee the average streaming rate, they do not provide strict periodicity, as the data is buffered at both ends in multi-media appliances and can therefore tolerate deviations in the delivery period. Thus, multi-media networks are not ideal for real-time motion control networks.

ARCNET

ARCNET is such a data communications network. Several companies are known to have motion control networks based on ARCNET (ATA/ANSI 878.1, 2 and 3). ARCNET is a medium speed token-bus network that can be operated to provide strict cyclic messaging. However, there are limitations to using ARCNET. The first limitation is a moderate bit rate (10 Mbit/s) that is not fast enough to send out torque/current demands. Moreover, the speed of ARCNET cannot be upgraded to 100 Mbit/s over copper without a fundamental re-design.

ARCNET can use twisted pair copper but has no scrambling and therefore data transmission may potentially cause electromagnetic interference. ARCNET can operate as a physical ring (or as a bus) but cannot operate after a link has been severed. Nor can it report where such a fault has occurred, thereby impeding automatic and remote fault diagnosis. ARCNET has no mechanism for auto-enumeration, which increases the time necessary to commission a machine. ARCNET, being half-duplex, cannot carry command and feedback data simultaneously. ARCNET uses a token-passing scheme; such schemes are inherently less robust in the event of electromagnetic interference than time-division multiplexing as the loss of the token requires the network to re-start a configuration process wherein the token is re-created. ARCNET has no propagation time correction mechanism and therefore would suffer significant data skew if a moderate number of nodes is used with a short cycle time.

IEEE Std 1394-1995 and prEN 1394b

This network is intended for multi-media applications and has a tree topology. The proposed 1394b version is to have both fiber and twisted pair copper layers, although neither has been reduced to practice to date. This network is proposed to operate at 100 Mbit/s or faster.

1394 is proposed to be cyclic, but not strictly cyclic. It is proposed to have a guaranteed rate for cyclic data but will delay transmission of the cyclic data depending upon network traffic. 1394 as proposed is restricted to an 8 kHz cycle rate, but rates of 16 kHz or more are required to update the torque/current demand in a motion control system. 1394b is proposed as full-duplex at the physical and data link layers but only half-duplex at the application layer. In other words, command and feedback data cannot be sent simultaneously. The proposed 1394 cannot operate as a ring and cannot operate all nodes in the event of a fault such as a broken cable. The proposed 1394 has auto-enumeration and node discovery but unfortunately these functions are 'hot-pluggable' (i.e. the network is re-enumerated when a new node is plugged-in or removed). Therefore, the position of a node within the network cannot be reliably used to signify the axis of control since this position would change if another node were disconnected during operation. Proposed 1394 has no time-correction mechanism for dealing with the situation where a synchronization message is received at different times at different points in the network, and therefore would suffer significant data skew if a moderate number of nodes were used with a short cycle time. Existing 1394 and proposed 1394b can, however, correct for a delay in sending a synchronization message.

Ethernet-IEEE 802.3-1998

This general network is intended for data communications applications and has a tiered hub topology that operates at 100 Mbit/s and above. The point-to-point physical layer can be used to form the network in one embodiment of the present invention.

Ethernet has no inherent cyclic messaging. Ethernet also cannot be operated as a full-duplex ring and therefore has no means of operating all nodes after a link has been severed. No known implementation of an Ethernet network can report where such a fault has occurred, thereby automatic and remote fault diagnosis is prevented. Ethernet lacks an appropriate mechanism for auto-enumeration since it cannot assign node numbers on the basis of position. Ethernet is normally half-duplex; full-duplex operation introduces the expense, complexity, and temporal uncertainty of using switches. Ethernet lacks a time-correction mechanism.

2. Networks Designed Specifically for Motion Control

The technical details of many of these networks are proprietary, and only some have been disclosed to the public. Only two of these networks possess a bus speed of exceeding 10 Mbit/s as is required to meet the fairly modest objective of achieving an update rate of 8 kHz on four axes with a telegram size of only 19 bytes.

SERCOS

The concept of cyclic, time-domain multiplexed messaging originated with the SERCOS network and was subsequently codified as IEC 61491. SERCOS is implemented upon a single fiber optic ring, is half-duplex, and can operate at up to 16 Mbit/s. While this network is accepted for use in certain industry sectors such as machine tools and automotive assembly lines, it has several significant limitations.

In a network with more than a few nodes, the SERCOS bit rate of up to 16 Mbit/s substantially limits the network cycle time to a moderate 1 ms. This moderate network cycle time in turn dictates that the position feedback loop must be closed at the drive rather than centrally at the motion controller. SERCOS networks thus limit the feasibility of close inter-axis coupling (including centralized implementation of electronic gearboxes and cams) and on-the fly changes of trajectory. The moderate bit rate also limits the number of axes that may be attached to a network to around 16 when there are many applications that demand more than 16 axes. SERCOS does not work with a copper transmission medium, which significantly increases the cost and poses a problem in applications where the network medium must be routed through flexible trunking such as cable retractors. This is due to the fact that the long term flexure characteristics of fiber are poor. SERCOS furthermore does not operate after a link has been severed, nor does it report where a fault has occurred. Finally, SERCOS has no mechanism for auto-enumeration and relies on DIP switches to identify nodes.

MACRO

MACRO is a proprietary network introduced by Delta-Tau Inc. It uses the FDDI fiber-optic physical layer to transmit 100 Mbit data on a single optical ring. MACRO has a weak error detection mechanism based on a checksum—not a CRC. MACRO, according the March 1999 specification has no long-haul (100 m) copper medium. MACRO cannot operate in a tree topology or in the event of a fault and lacks node discovery and auto-enumeration capabilities. It is unclear whether MACRO has a time-correction mechanism and therefore may suffer significant data skew if an even moderate number of nodes were used with a short cycle time.

SUMMARY OF THE INVENTION

Accordingly, it is an object of this invention to provide a system for motion control, a method of using a system for motion control, and a computer readable medium storing instructions for operating a system for motion control that provides a motion control system with a reduced need for wiring while retaining centralized control of the motion system.

These and other objects of this invention are achieved according to the present invention by providing a novel system, a method of using the system, and a computer program product storing instructions for implementing a system for motion control. This system for motion control includes a central controller configured to generate first and second demand control signals defining actuation motion of respective first and second actuators; first and second nodes in communication with the central controller, each node including, at least a respective one of the actuators configured to implement at an actuator time an action based upon the respective demand control signal, and a memory configured to store at least one respective propagation delay parameter related to a signal propagation delay between the central controller and the node; a timing mechanism configured to establish timing at each node based on the respective propagation delay parameter so that the actuator times at the nodes occur simultaneously; and a data network configured to place the first and second nodes in communication with the central controller.

A node configured to be in communication with a central controller over a data network can thus include a delay correction memory configured to store a delay correction signal related to a propagation delay between the central controller and the node over the data network; and an actuator configured to implement a motion or force-related effort at an actuator time based upon the stored delay correction signal. A node configured to be in communication during operation with a central controller over a full-duplex data network can alternatively include a first receiver configured to receive a first signal transmitted along a first direction over the data network; a second receiver configured to receive a second signal transmitted along a second direction over the data network; and an actuator configured to implement an action based one of the received first signal and the second signal.

The operations of a plurality of actuators in a system for motion control can thus be synchronized by determining a respective propagation delay between a central controller and each actuator of the plurality of actuators; and timing operations of each actuator of the plurality of actuators based on the determined respective propagation delay for each actuator.

A plurality of nodes controlled by a central controller in a system for motion control can be autoenumerated by linking the central controller and the nodes in a network; transmitting a query message from the central controller in along the network; receiving the query message at a node of the plurality of nodes in the network; transmitting an answer message to the query message along the network from the node to the central controller, the answer message enumerating the node; receiving the answer message at the central controller; retransmitting the query message from the central controller along the network; relaying the retransmitted query message through the enumerated node to a further node; and transmitting a further answer message to the query message along the network from the further node through the enumerated node to the central controller, the further answer message enumerating the further node.

Moreover, the operations of a plurality of nodes in a ring network controlled by a central controller can be maintained in the event of a fault by transmitting first messages addressed to plural respective nodes in a first direction along said ring network; monitoring first reply messages transmitted by said plural nodes in a second direction along said ring network in response to the transmitted first messages; identifying, when first reply messages are not received from each node to which a first message was transmitted, a first subset of nodes from which said first reply messages are received, and based thereon, determining a second subset of nodes exclusive of said first subset of nodes, from which respective first reply messages were not received; transmitting in said second direction, when first reply messages are not received from each node to which a first message was transmitted, second messages addressed to respective nodes in said second subset of nodes; receiving second reply messages transmitted by respective of said nodes of said second subset of nodes in response to said second messages, said second reply messages traveling in said first direction along said ring network; transmitting in said first direction third messages addressed to said first subset of nodes; and transmitting in said second direction fourth messages addressed to said second subset of nodes.

Finally, a computer readable medium storing instructions for execution on a computer system, which when executed by a computer system, can cause the computer system to synchronize the operations of a plurality of actuators in a system for motion control, autoenumerate a plurality of nodes controlled by a central controller in a system for motion control, or maintain operations in the event of a fault of a plurality of nodes in a ring network controlled by a central controller as described above.

Further objects and advantages of our invention will become apparent from a consideration of the drawings and the technical description.

BRIEF DESCRIPTION OF THE DRAWINGS

A more complete appreciation of the invention and many of the attendant advantages thereof will be readily obtained as the same become better understood by reference to the following detailed description when considered in light of the following drawings, wherein:

FIG. 5 illustrates examples of different types of network telegrams in tabular format;

Figure 19:
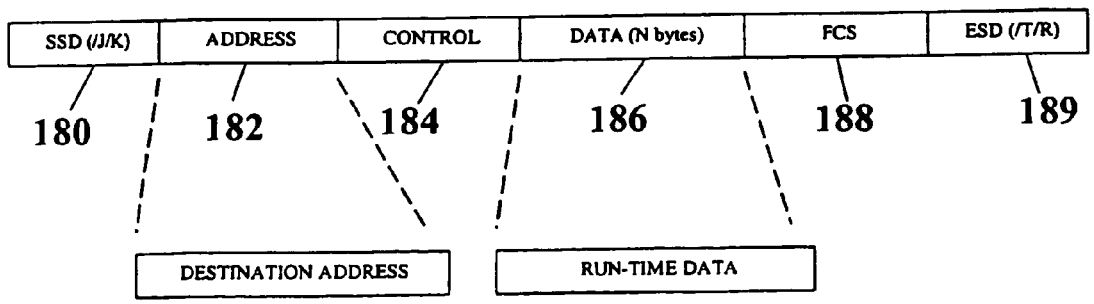
Figure 20:
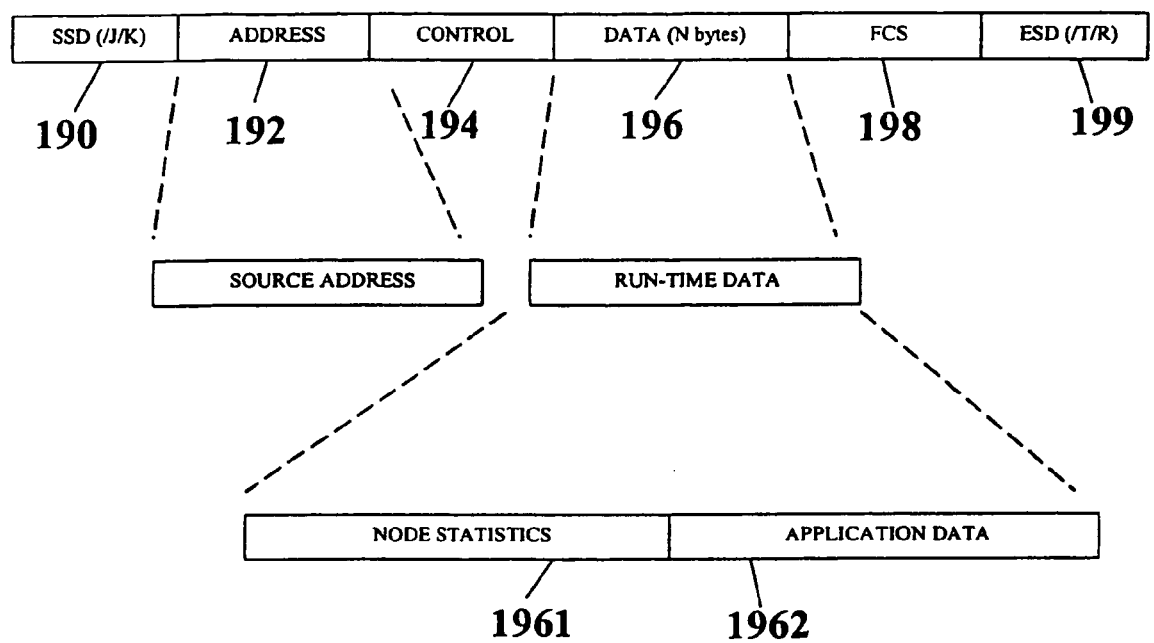
Figure 21:
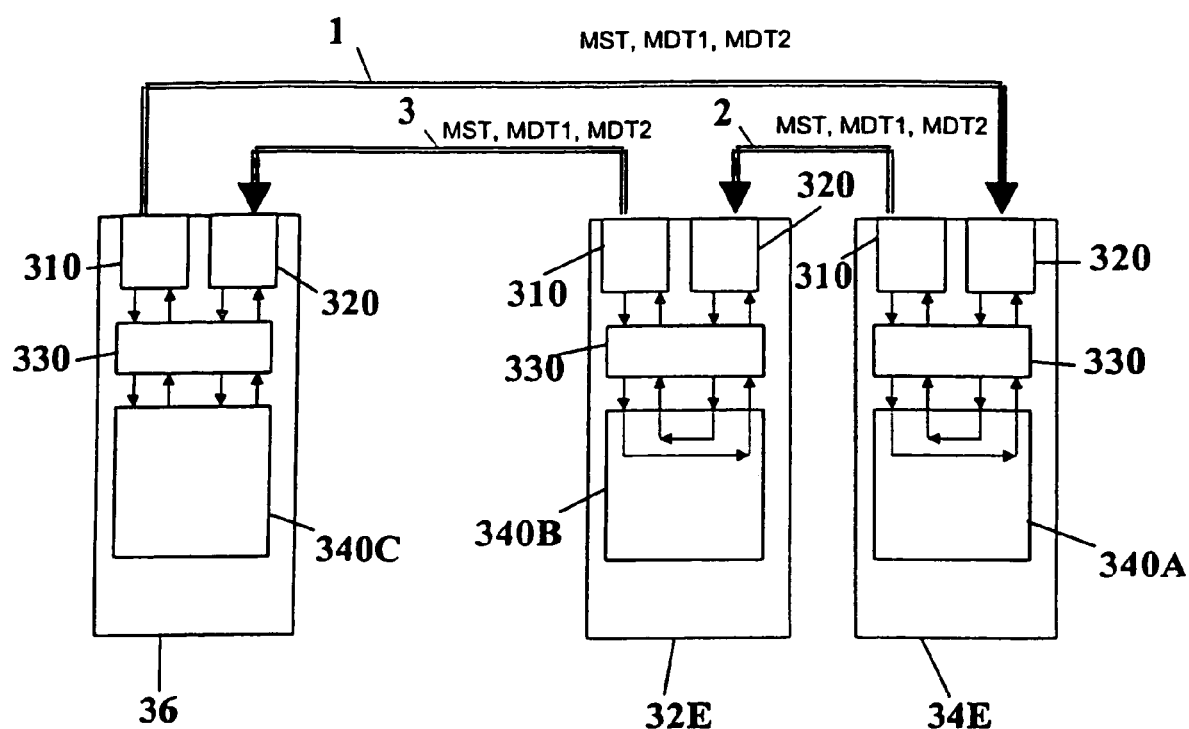
Figure 23:
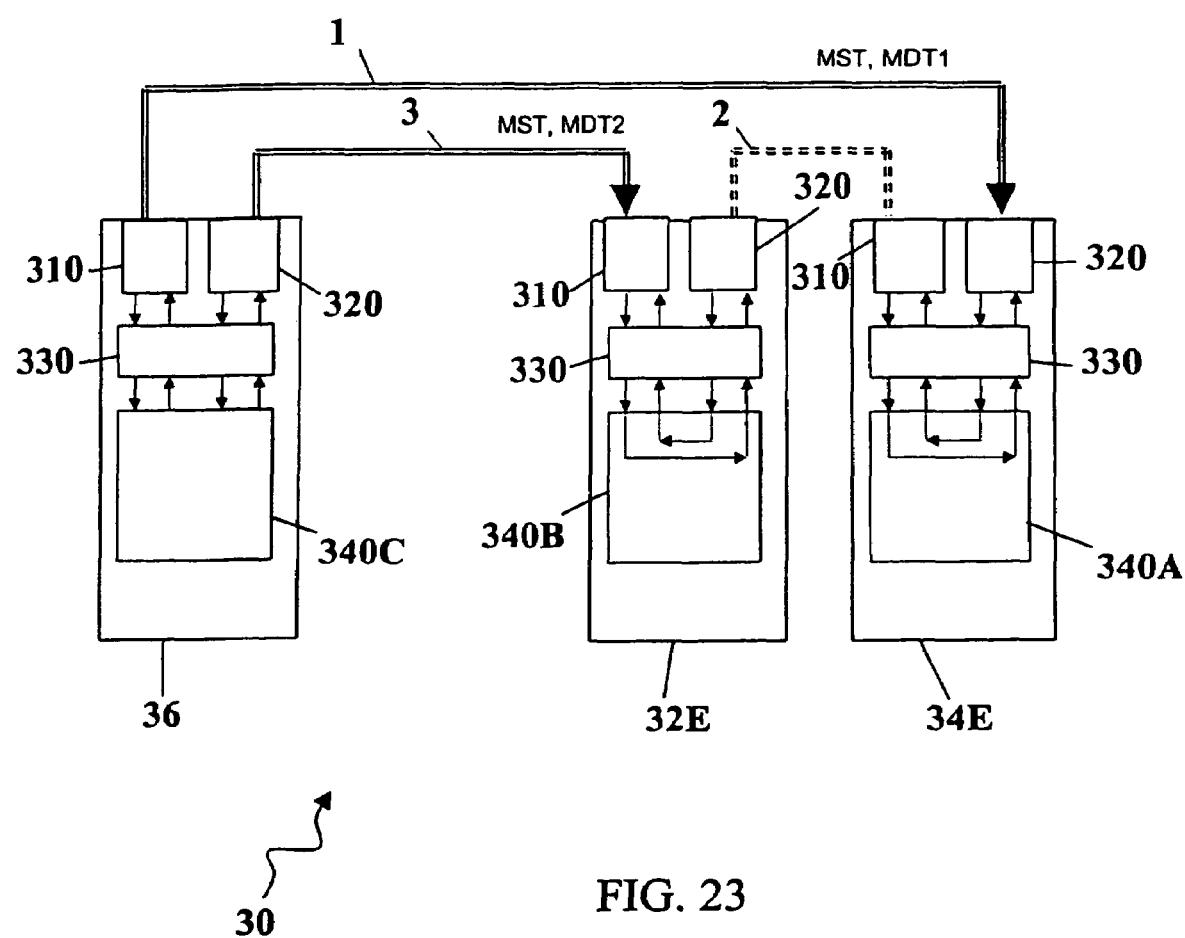
Figure 24:
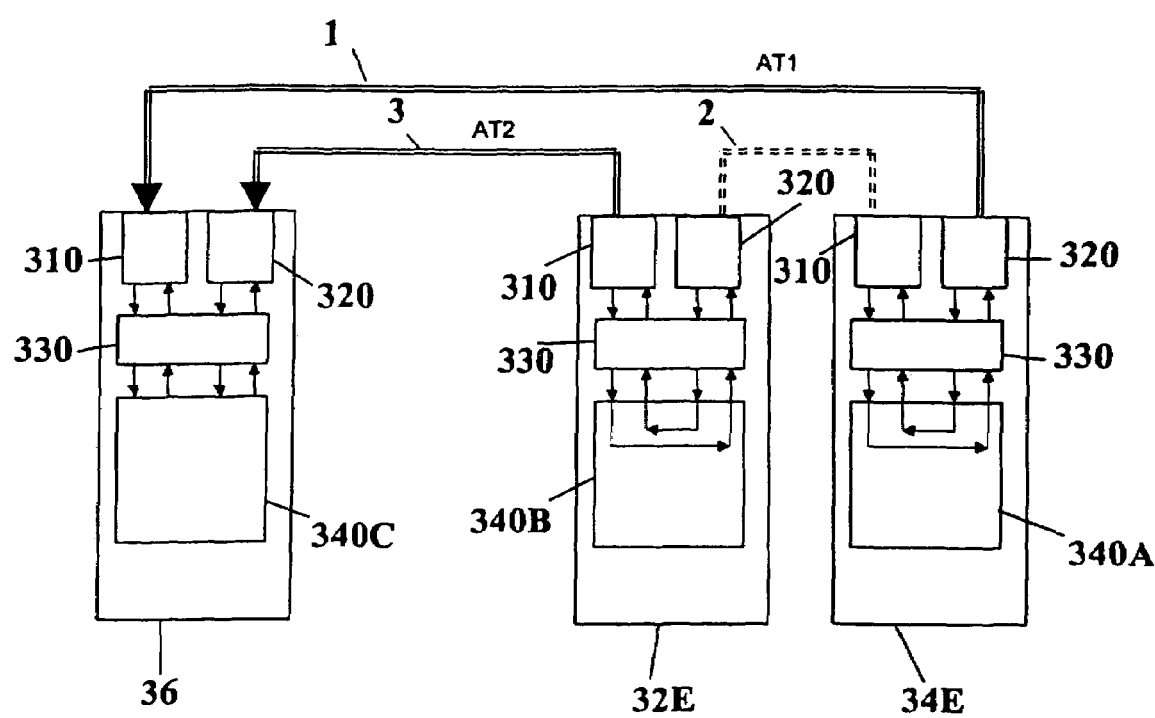
Figure 25:
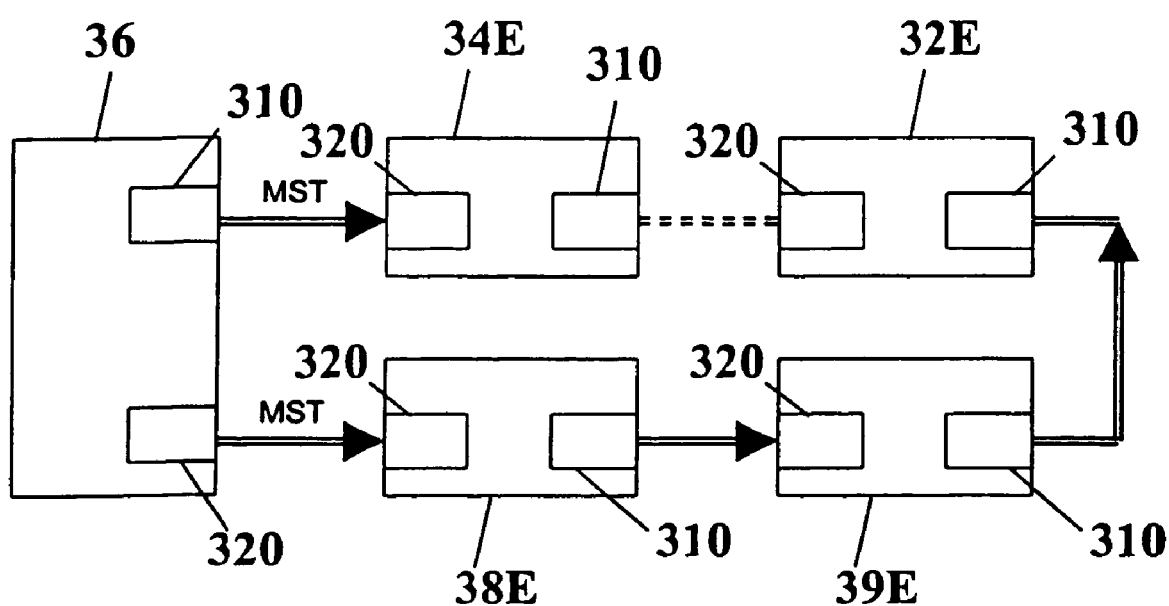
Figure 26:
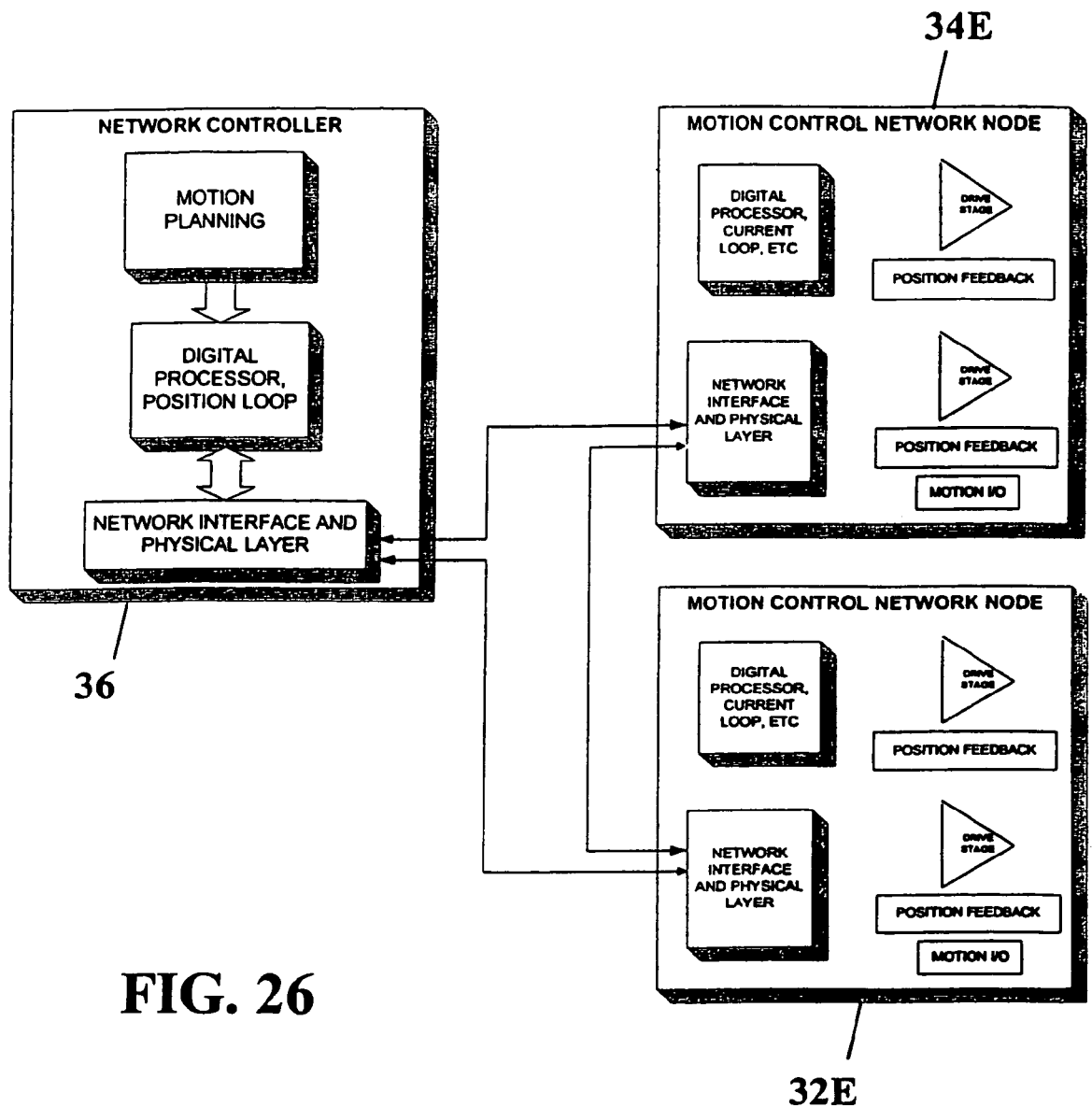
Figure 27:
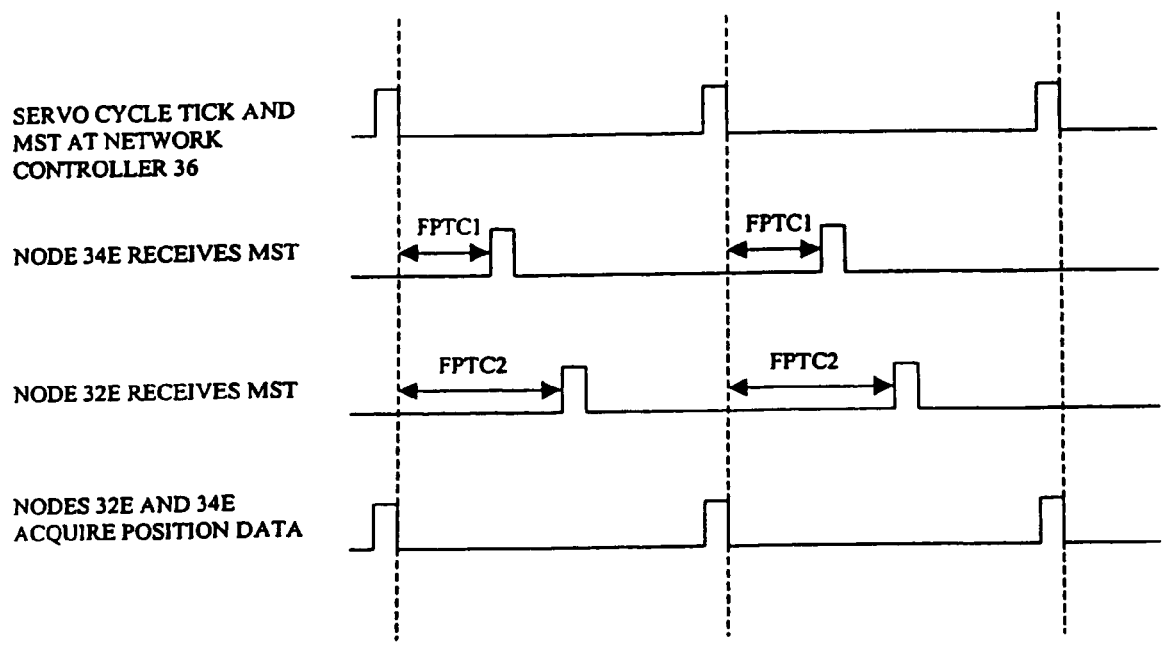
Figure 28:
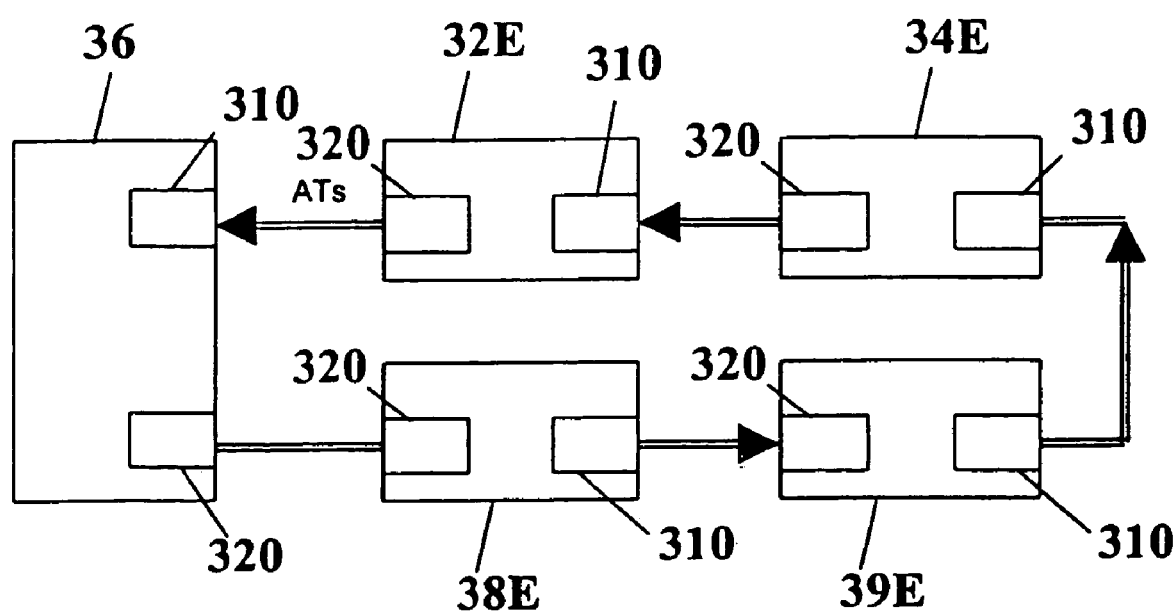
Figure 29:
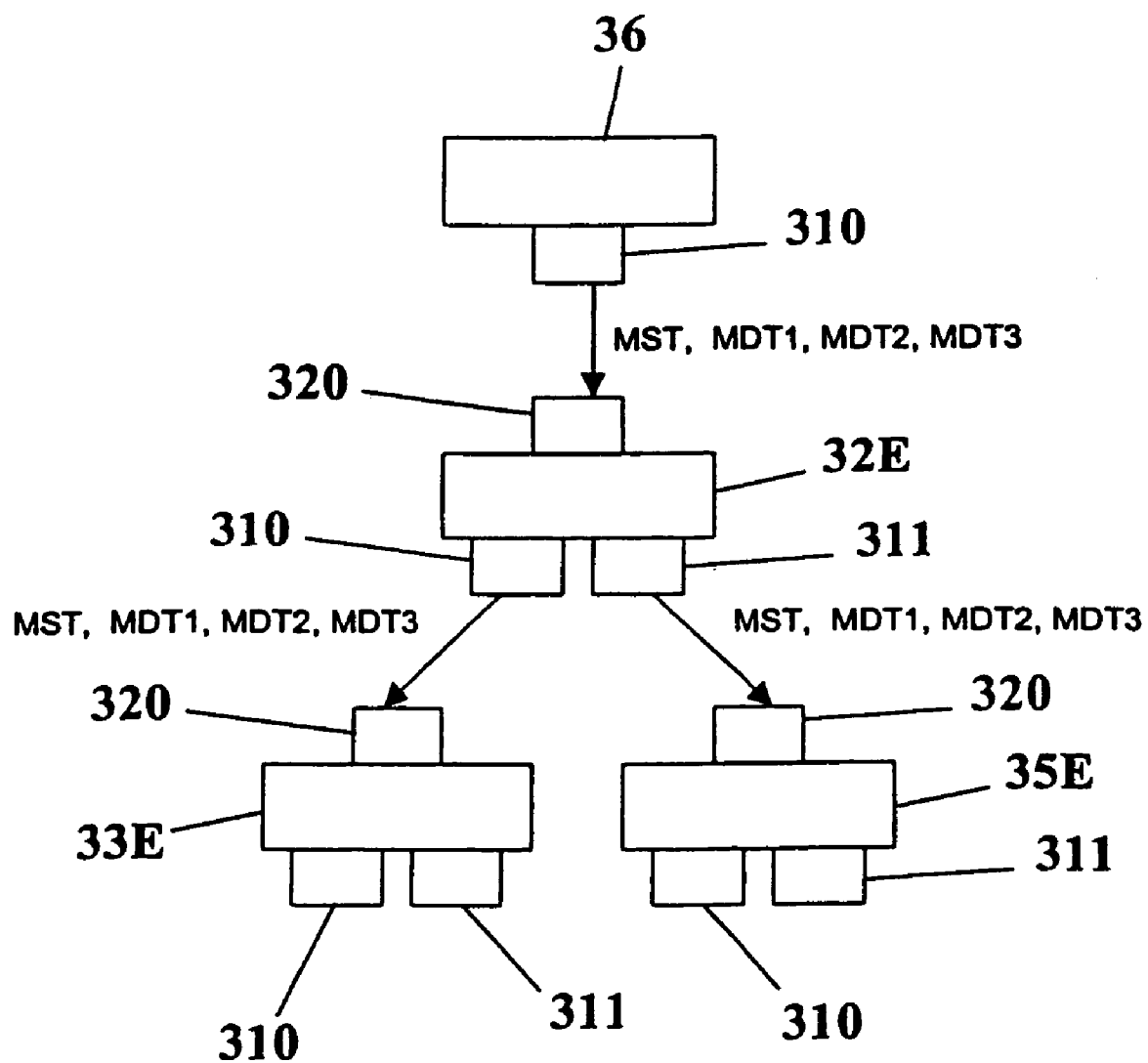
Figure 30:
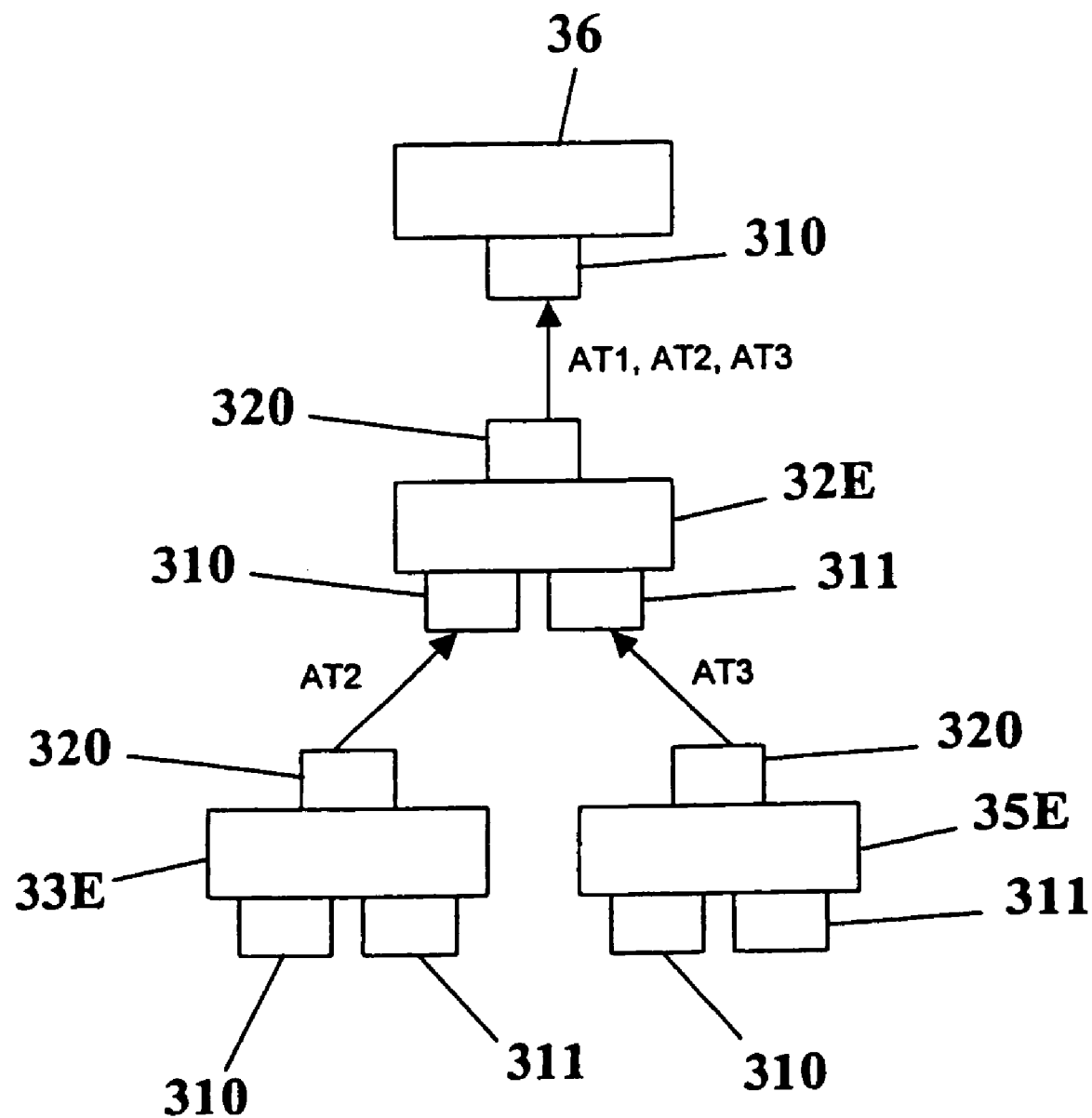

FIG .18 illustrates an exemplary format of a Master Synch Telegram;

FIG. 19 illustrates an exemplary format of a Master Data Telegram;

FIG. 20 illustrates an exemplary format of an Amplifier Telegram;

FIG. 21 illustrates examples of outward messaging on a ring network that occurs during the operational phase;

FIG. 22 illustrates examples of inbound messaging on a ring network that occurs during the operational phase;

FIG. 23 illustrates examples of outbound messaging on a ring network that occurs under fault conditions during the operational phase;

FIG. 24 illustrates examples of inbound messaging on a ring network that occurs under fault conditions during the operational phase;

FIG. 25 illustrates an exemplary approach to network timing under fault conditions;

FIG. 26 illustrates a simple exemplary ring network;

FIG. 27 illustrates a timing diagram describing the synchronous operation of multiple nodes;

FIG. 28 illustrates another simple exemplary ring network used to describe scheduling (strict timing and free timing);

FIG. 29 illustrates outbound messaging in a tree network during the operational phase; and FIG. 30 illustrates inbound messaging in a tree network during the operational phase.

DETAILED DESCRIPTION OF THE PREFERRED EMBODIMENTS

Figure 2:
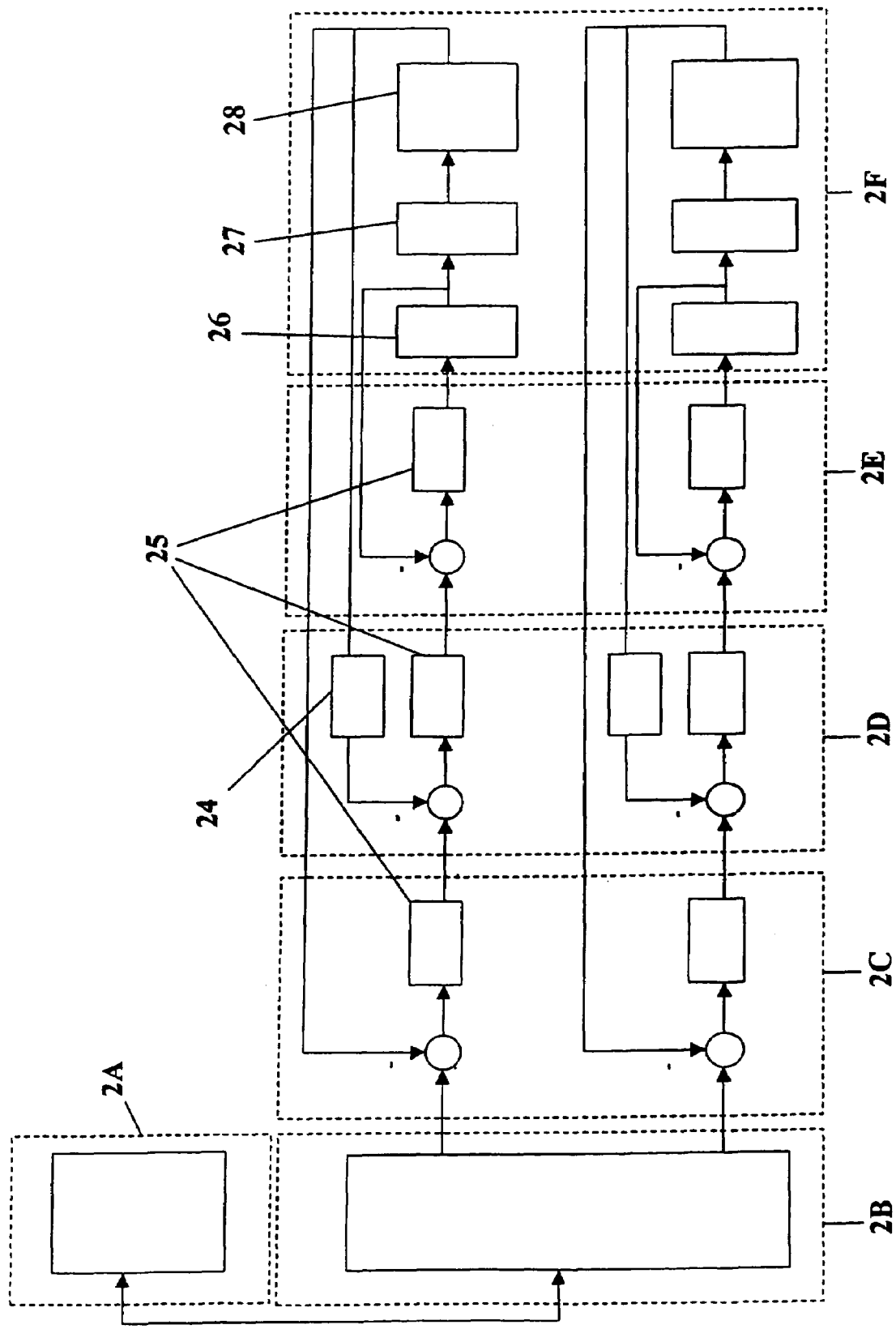
FIG. 2 illustrates exemplary layers of the cascade control of a two-axis motion control system variation of FIG. 1.

Referring now to the drawings, wherein like reference numeral designate identical or corresponding parts throughout the several views, and more particularly to FIG. 2 thereof, wherein a generic two-axis control system with each element of the cascade is illustrated. Each of the regions 2A, 2B, 2C, 2D, and 2E represent elements of the control system. Namely, 2A illustrates an exemplary system host and man/machine interface, 2B illustrates a motion planning device, 2C illustrates an exemplary position control element, 2D illustrates an exemplary velocity control element (including a differentiator 24 on the feedback line), 2E illustrates an exemplary current/torque control element, and 2F illustrates an exemplary drive unit which may include, for example, a signal amplifier 26, the motor/actuator 27, and position, velocity, and/or acceleration transduction elements 28. Although the feedback to each of the control elements is shown as including a PID (Proportional Integral Differential) control 25, it is to be understood that various forms of digital compensation elements may be used. The actual digital compensation elements used will depend upon the position of the control element in the cascade and the control system application.

Moreover, some motion control systems operate by providing a series of discrete signals to the actuators. Examples of such signals are Step and Direction and Clockwise/Counterclockwise. In these systems, either no closed loop feedback is required, or the closed loop control is in the drive and the drive is controlled by discrete signals from the motion controller. These systems still have many of the elements of the cascade. Although the example of servo control systems is used for this invention, closed loop feedback is not an integral part of the invention, and the inclusion of discrete actuators using the invention is explicitly included.

Figure 1:
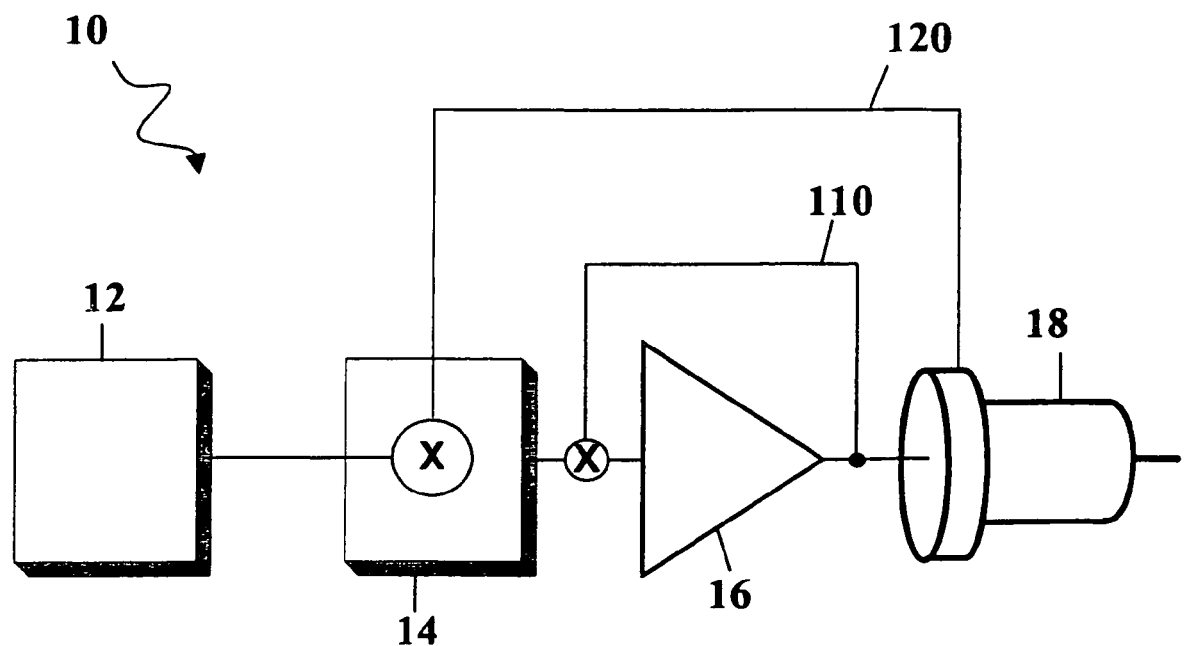
FIG. 1 illustrates an exemplary one-axis motion control system.

Although each of the elements of the cascade are illustrated as discrete units in FIG. 2, modern implementations of control systems often combine one or more of these units. For example, as described in regard to FIG. 1, position 2C and velocity 2D control can be combined in a single controller. As a further example, the most common implementation of a motion control system is a "motion controller" that includes a program running on a central processor unit that, in some embodiments, may itself be in communication with a system host (such as a personal computer) that also supervises other machine control functions such as a vision system, a display, etc. for motion planning. In these systems, not only will all of the motion planning be carried out in the "motion controller," but at least a part of the cascade control structure will be implemented at the motion controller as well. The part of the cascade control implemented at the motion controller commonly includes either just the position control loop or both the position and velocity control loops, indicated in FIG. 2 as 2C and 2D, respectively. The highest performance existing motion controllers are formed by a dedicated motion control processor printed circuit card, with an associated motion programming interface, residing on the bus of a system host. The combination host/board level motion controller performs all of the tasks illustrated as units 2A, 2B, 2C, and 2D in FIG. 2. Such a motion controller is commonly referred to as a centralized motion control system because all motion planning decisions are taken centrally, all data is collected centrally and almost all control loops are closed centrally. Either of the units 2C or 2D of FIG. 2 thus represents the extent of the cascade control that is implemented at the motion controller. In a real centralized motion control system, the control signals are analogue or pulse demand signals that are sent from the motion controller to the drive, and position feedback signals are returned from the transducer 28 on the motor 27 (possibly routed via the drive).

Although these serve as the fundamental operational platforms of motion control systems in many thousands of operating machines, it is recognized that these platforms have many shortcomings. Firstly, the cost of the cabling (demand cable, feedback cable, and I/O cable plus connectors—in the whole amounting to 14 to 20 or more terminations), is quite high. The installation of the cabling, especially where the control signals for multiple axes are to be routed through a drag chain or cable retractor, is quite difficult and/or bulky. For example, drag chains are typically used when signals must be routed to a moving control element, such as the machine head suspended on an XY stage. The drag chain is thus often moved at high speeds. If the machine head (pick/place head, etc.) uses servo motors, the drag chain will have a large number of wires and will be quite inflexible and large. Furthermore, these motion control systems do not provide a mechanism for gathering data other than the transducer (position) feedback signal from the amplifier or motor. As yet another example of a problem in motion control systems, the distance between the motion controller and the drive is limited in practical terms.

For these and other reasons, there is a growing tendency towards the adoption of digital networks in motion control systems. A digital network, properly implemented, eliminates the need to route the 14-20 or more lines per axis from the motor/drive/position sensor to the host. Rather, one thin two-pair network cable connects all local control nodes to the host. The use of local nodes allows the 14-20 or more lines to be limited to the area immediately surrounding the motor. The reduction in wiring count and complexity is thus quite dramatic. Such a system is commonly referred to as a "distributed motion control system" in the literature although the term "networked control system" might be more accurate since networks can be used either to concentrate control functions at the center or to distribute them to the nodes.

Distributed motion control systems retain the fundamental cascade control structure, but insert a two line, digital communication path (e.g., a network) between at least two of the elements 2A, 2B, 2C, 2D, and 2E in FIG. 2. In the design of distributed motion control systems, there are many options regarding the location of the network in the cascade control system. The various locations may all achieve the same reduction in wire count, but result in significant differences in system design and performance.

The first common location of the network is between the units 2A and 2B of FIG. 2. In this case units 2B, 2C, 2D, 2E and 2F are divided-up (horizontally in the diagram) on a per-axis basis into separate networked drive units. Employing the network at this location transfers all of the cascade control for each axis to the drive itself together with the associated motion planning. The drives in the resulting control system are called "smart drives," and the network is employed to link the smart drives to the host (2A in FIG. 2). This arrangement can work satisfactorily provided that the motion planning, and indeed the cascade control, for each axis can be independent. In other words, there should be little or no need for inter-axis coupling (necessary, for example, to perform coordinated multi-axis moves) to enable use of this architecture. Since all of the high speed control loops are in the drives, there are no feedback signals transmitted across the network and a moderate bandwidth network is adequate.

However, many machines and manufacturing processes require tight inter-axis coupling to, for example, implement coordinated multi-axis moves, realize electronic gearboxes, change trajectories on-the-fly, and achieve time-optimal moves. Examples of such machines include a pick and place machine for electronic surface mounted components and machines used to process and to package semiconductors. In such cases, not only does the motion planning require simultaneous actions along more than one axis but the cascade control system may also pass terms from one axis to another (not indicated in FIG. 2 for reasons of clarity). Hence, it is often essential to retain the flexibility of a central motion controller.

There are other problems with implementing a multi-axis motion control system using multiple smart drives. A first problem is that, by transferring extra responsibility to the drives, extra hardware is added to each drive. This hardware includes, for example, not only extra processor(s) and memory, but also other features such as I/O and displays. Thus, on the system level, much of this hardware and its functionality is unused and/or redundant, but it still must be purchased and space must be provided at the drive. A second problem, which is indicative of recent developments in smart drives, is that it is necessary to write and maintain separate programs for each smart drive. Moreover, this must be done in the absence of a standardized programming environment for all drives. No longer are the familiar 'C' (or other high level programming environment) compilers provided by the major vendors of board level controllers available, and in their absence there is no standardized method of communication with smart drives. Another significant disadvantage is that smart drives are more difficult to miniaturize than simple drives. This makes it difficult to achieve the optimum wiring reduction possible for a distributed motion system: no existing high performance smart drives are small enough to mount on a pick/place head for fast SMT machines and thus a smart drive would not lower the wire count in the drag chain for this application.

The case for retaining the concentration of control functions at the center in a multi-axis control system is thus compelling. A problem remains in that it is difficult to retain this centralized model yet adopt a network connection to the drives in order to achieve the desired wiring reduction because of the extra demands this places on the network.

The second common location of the network is between the units 2C and 2D or between the units 2D and 2E shown in FIG. 2. This location retains centralization of control functions and uses the network solely to achieve wiring reduction and data gathering. Employing the network at these locations places the network between the motion controller and the drives along the control cascade. Since the network is digital, the motion control system is in fact a sampled data system. The motion planner provides demands at a regular rate (typically a value in the range 1 to 4 kHz), the control loops in the cascade control system operate more quickly (typically 1 to 4 kHz for the position loop and 2 to 8 kHz for the velocity loop) and the current loop operates at 16 kHz or faster.

It is desirable in a sampled data system for the various elements to operate in synchronism so as to avoid the uncertainties that would be introduced by variable transport delays and in a networked sampled data system this means that there must be a common network time reference. One known method of generating a common network time is as follows: the motion controller emits a timing reference message at regular intervals and the receiving nodes then each use this signal to calibrate a local clock which is derived from a much higher local frequency source. This local clock is used as the timing reference for the PWM and any local control loops. Typically, the multiplication of the network timing reference is performed using phase locked loops. For this reason, strictly cyclic messaging is required since any jitter on the network timing reference will propagate into all of the dependent local clocks. Moreover, in a physically large network (or one where the messages pass through numerous repeaters), the propagation delay to the nodes may be significant and will differ from one node to another and this can introduce delays and therefore non-simultaneity into the node clocks.

Figure 3:
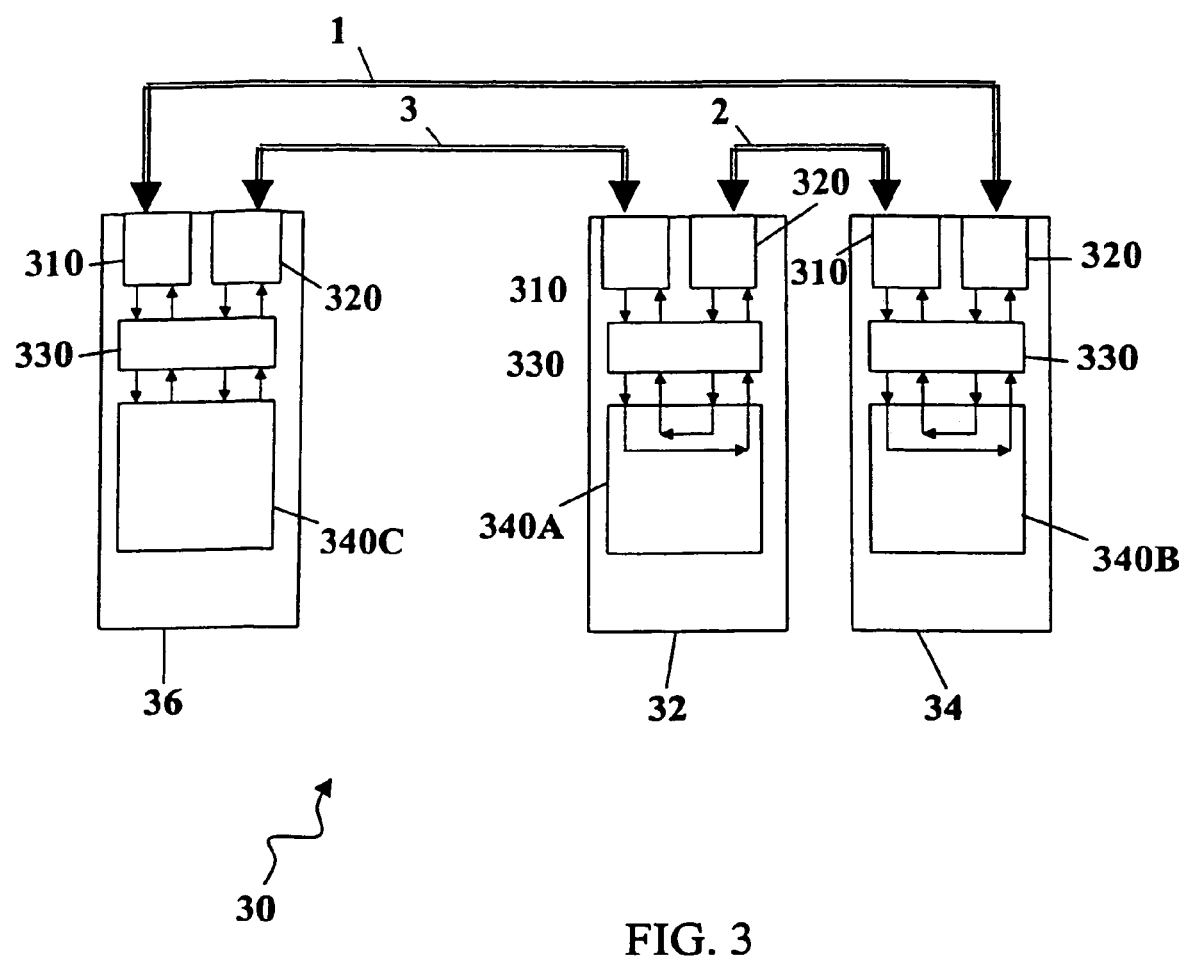
FIG. 3 illustrates an exemplary system cabled in the ring topology.

FIG. 3 illustrates an exemplary network 30 for motion control according to the present invention that is cabled in full-duplex ring topology. The ring topology illustrated is cheaper than a tree because there is no requirement for a hub or extra ports at each node and is thus normally preferred. The physical layer of this network for motion control 30 can be based, e.g., upon known data transmission networks such as, for example, IEEE 802.3-1998, Clauses 24-26. IEEE 802.3-1998, Clauses 24-26 are in turn based upon ANSI X3.263-1995 and thus a choice of fiber or copper transmission media is offered. Such a physical layer is generally known as 100BASE-X, but the wiring topology does not follow IEEE 802.3-1998, Clauses 24-26.

The network for motion control 30 includes nodes (alternatively referred to as slaves) 32 and 34 of FIG. 3 that are connected by a network link 2 to each other on one side and to the master (motion controller) 36 on the other side by network links 1 and 3, as illustrated in FIG. 3. Further nodes can be added to the ring topology with further links. The addition of a further node will result in a node being connected only to the other nodes, and not with the master 36. The network 30 in this exemplary embodiment is strictly master-slave. The master 36 initiates all communication. The slave nodes 32 and 34 respond to the master 36, and do not communicate with one another. The master 36 can also broadcast to one or more of the nodes 32 and 34.

Each of the nodes 32 and 34 and the master 36 includes a P0 port 310, a Q port 320, at least one PHY ("physical entity") device 330, and a MAC ("medium access controller") 340A, 340B, or 340C. PHY devices 330 are attached to a transmission/reception port on one side and to the MAC 340 on the other. PHY devices 330 are part transceiver, part encoder/decoder and send and receive signals on a point-to-point link. PHY devices 330 thus operate at the level of bits and symbols and are available off-the-shelf either as silicon or as IP cores conforming to the appropriate standards of the selected physical layer that forms the ring network 30. The MAC's 340A, 340B, and 340C implement the digital logic responsible for exchanging messages with (typically) a processor on one side and the PHY 330 on the other. The MAC's 340A, 340B, and 340C operate at the level of symbols and messages. The master MAC 340C and slave MAC's 340A and 340B have different functionality.

The MAC devices 340A and 340B in the slaves act either as the originator of a message or they can repeat incoming messages. In the ring network 30, a message received at the PHY 330 on the Q port 320 is repeated through the PHY 330 at the P0 port 310 and a message received at the PHY 330 on the P0 port 310 is repeated through the PHY 330 at the Q port 320. The exemplary physical layer supports point-to-point links only, i.e., it cannot be wired as a bus and this is generally true of all physical layers than run faster than around 20 Mbit. Therefore, messages that are to be received by a node beyond the end of a given link must be conveyed through a repeater and re-transmitted. Since the network is full-duplex, a repeater is required for each direction.

The repeater function of the MAC devices 340A, 340B, and 340C is implemented using a FIFO in each direction (not shown). Aside from conveying telegrams to further nodes, the FIFO's achieve two other objectives. Firstly, they isolate the clock domain of the receiver from the local clock domain (which is also the transmitter clock). Secondly, they allow the inevitable slight differences in the transmit clock and receive clock frequencies to be tolerated without loss of data.

The required depth of the FIFO depends upon the maximum discrepancy between clock frequencies, the FIFO width (it is normally 4-bit wide, depending on the PHY devices) and the maximum packet size.

The final link in the ring network 30 is referred to as the return link 3. The return link 3 is largely redundant for operational traffic since the network 30, being full-duplex, allows unrestricted communication with all slaves 32 and 34 via the P0 port of the master 36. However, the return link 3 to the Q port of the master 36 is needed to allow the master 36 to verify that packets transmitted from the P0 port of the master 36 travel through the complete ring network 30 to the Q port of the master 36. Similarly, packets transmitted from the Q port of the master 36 will reach the P0 port of the master 36 via the ring network 30. In the event of a fault condition it is possible to infer the position of the fault by noting which messages fail to be received at the P0 port 310 and Q port 320 of the master 36.

The network links 1 and 3, the P0 port 310 and the Q port 320 are off-the-shelf, commercially available items (PHYs, cabling, fibre, couplers/connectors). The PHY 330, the FIFO, and the MAC devices 340 can be implemented in an FPGA or other digital logic such as an ASIC. All functions including the automatic answer mechanism, the phase-locked loop to create the local clock, the FPTC/RPTC time correction mechanism, the detection of a severed link by a timer watchdog and subsequent use of the MTT instead of the MST are digitally realized.

In such a network system 30, the master 36 (motion controller) can perform current/torque feedback control of a motor or actuator node 32 and/or 34. For example, in a network system 30 for motion control with 16 axes, a 16 kHz update rate with a total telegram size of 24 bytes in each direction has a bit rate of at least 100 Mbit/s. This is within the capabilities of the network system 30 described above.

The network communication within the ring network 30 is in the form of short packets sent out from the master (motion controller) 36 at regular intervals to provide the demand signals, and short packets sent back from the nodes 32 and 34 to the master 36 at regular intervals to provide feedback and monitoring data. Not only must the regular intervals align with the control system loop rate at the point in the control cascade where the network 30 is inserted but a network time must be established so that all demands take effect simultaneously and all feedback is acquired simultaneously.

Figure 4:
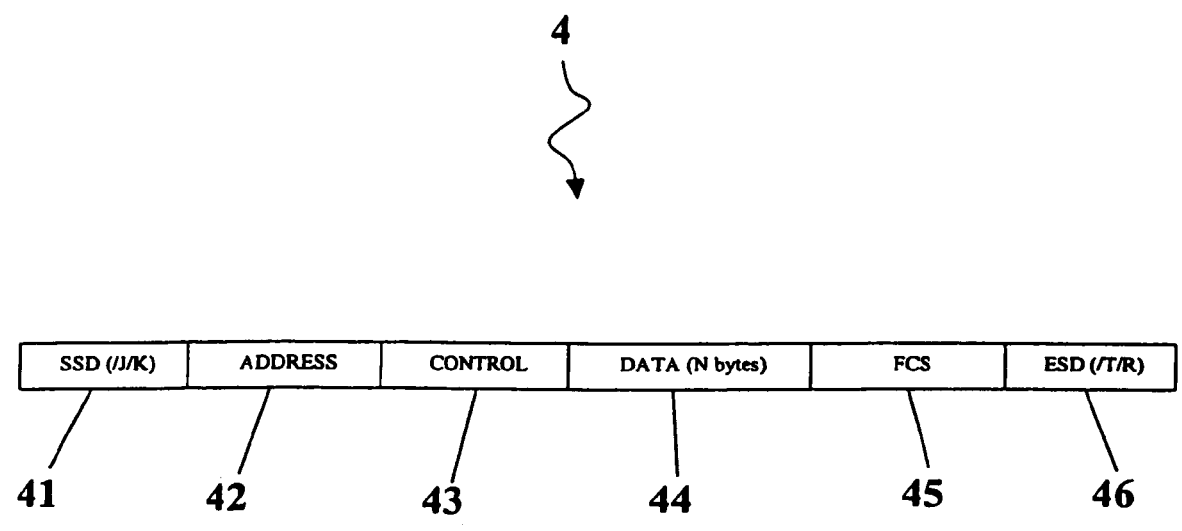
FIG. 4 illustrates an example format of a network telegram.

An example of a telegram 4 that would be transmitted from the master 36 is illustrated in FIG. 4. The telegram includes an address field 42, a control field 43, a data field 44, and a frame check sequence 45. The start of stream 41 and end of stream 46 delimiters delineate the telegram.

Each address field 42 can be used to identify the destination node (such as slave nodes 32 and 34 of FIG. 2) for the data in the telegram. Each slave node recognizes at least one slave address, namely the base address for that node. In some embodiments, a node may include more than one control entity such as, for example, a servo axis. In these cases, there is an additional network address for each additional control entity that is present at the slave node. The base address of a slave node can be assigned topologically during the node discovery process and the additional addresses for the additional control entities can sequentially follow the base address. For example, a network 30 consisting of two four-entity nodes can be enumerated [1, 2, 3, 4] at the first node and [5, 6, 7, 8] at the second node. In one embodiment, the address field is one byte long and its meaning (the address of the source node or the address of the destination node) varies according to the telegram type.

Each control field 43 can be used to indicate the type of telegram 4 being transmitted to the receiving node. Furthermore, it can also indicate how the address is to be interpreted. FIG. 5 enumerates examples of different types of network telegrams in a tabular format. For the sake of convenience, a naming convention can be adopted as illustrated in FIG. 5, where telegrams originating from the master start with M and those from the slaves start with A for amplifier. Different telegram types can also be associated with different operational states (otherwise referred to as phases) of the network for motion control. Naturally, other telegram types that perform additional functions or combinations of the functions described below can be added to extend the capabilities of the network, and this would be denoted in the control field 43. The specific telegram types illustrated in FIG. 5 are provided solely to further clarify some of the communication capabilities of the network according to the present invention.

Each data field 44 of the telegram 4 has a variable length and is used to communicate data between the master 36 and the nodes. This data can include, for example, actuator or actuated object position information for motion control, and the drive signals themselves. Given the state of the art in current physical layers, there are preferred limits on the length of the data fields 44, although it will be obvious to those skilled in the art that larger data fields 44 can be used as equipment is developed. The current limits are determined by, e.g., the efficacy of the frame check sequence and the depth of repeater FIFO's, as well as other economic and operational considerations. In a typical embodiment, 2048 bytes is considered practicable at the present time.

The frame check sequence 45 is used to identify errors in the telegram 4 that typically arise due to equipment malfunction and/or electrical interference. A frame check sequence suitable for use in the present invention is a 32-bit CRC according to IEEE802.3-1998 Clause 3.2.8, namely $$G(x)=x^{32}+x^{26}+x^{23}+x^{22}+x^{16}+x^{12}+x^{11}+x^{10}+x^8+x^7+x^5+x^4+x^2+x+1$$

since this sequence is known to be compatible with the scrambler polynomial in the physical layer.

Figure 6:
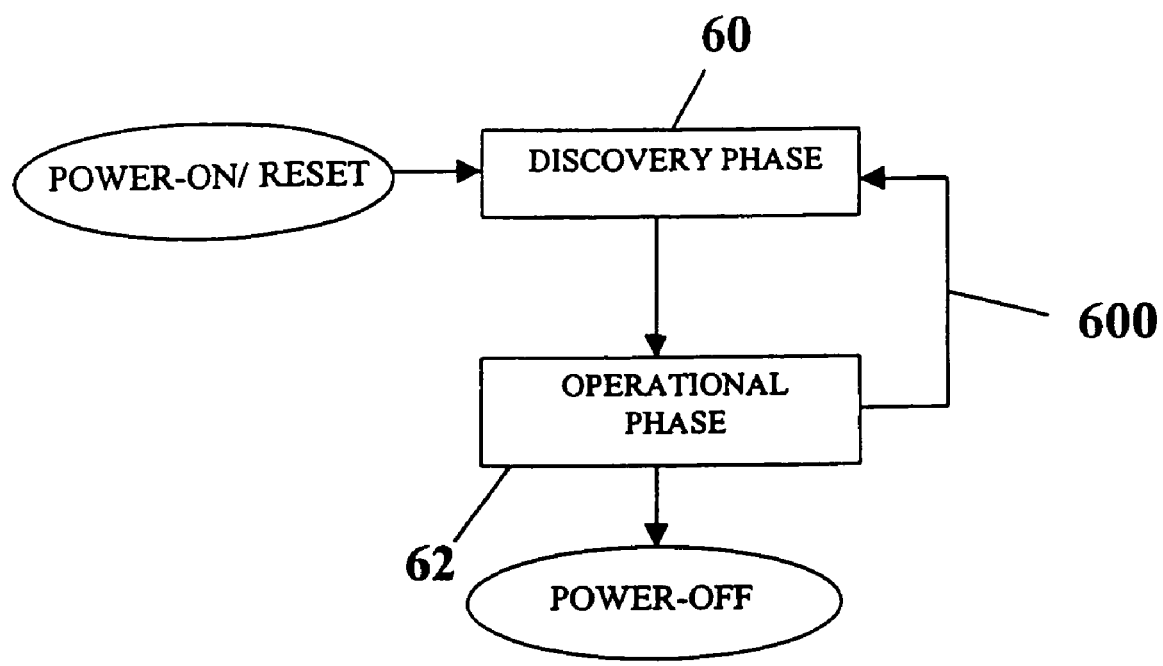
FIG. 6 illustrates an exemplary state diagram of a system for motion control.

As illustrated in the state diagram of FIG. 6, the network operation has two phases (or states), namely the discovery phase 60 and the operational phase 62.

The discovery phase 60 describes operations whereby the nodes (such as, e.g., node 32 and 24 of FIG. 3) are discovered and enumerated (e.g., assigned address and other network parameters) by the master 36. Communication during the discovery phase 60 is asynchronous and the slave normally sends a telegram in response to one received from the master 36.

On the other hand, the operational phase 62 is characterized by cyclic communication. For example, the master sends a timing telegram (e.g., the MST of FIG. 5) followed by the telegrams conveying the position/velocity/torque/current demands (MDT's) and the slave sends back status and feedback data as amplifier telegrams (ATs).

The exact time at which the telegrams such as the ATs and MDT's are sent must meet certain criteria for correct operation of the physical layer. However the relationship between the two can be freely chosen to meet application needs; for example the MDT could be sent before, after, or simultaneously with the AT for a given node. In one embodiment, all ATs and MDT's must be completed before the next MST so that timing can be updated regularly.

Figure 7:
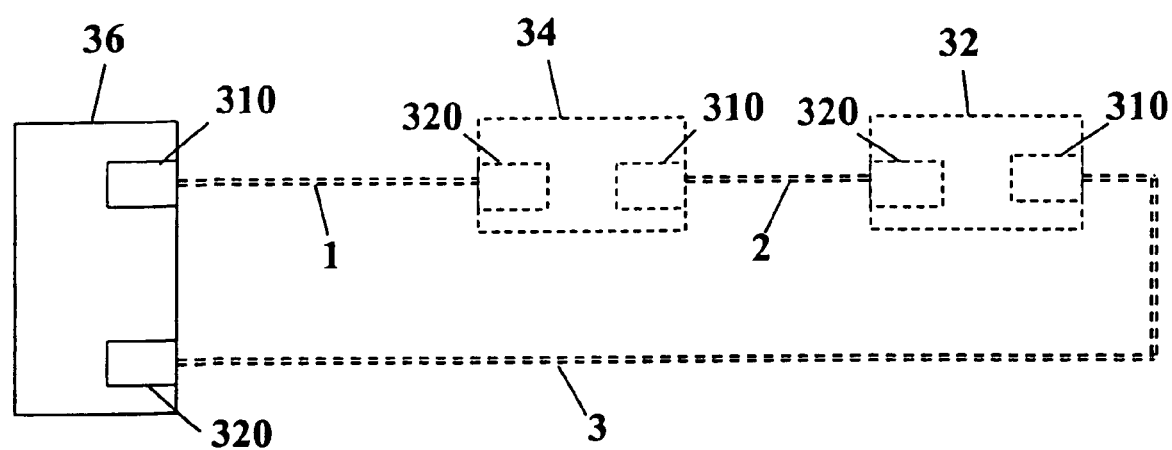
FIG. 7 illustrates a simple exemplary undiscovered ring network.
Figure 8:
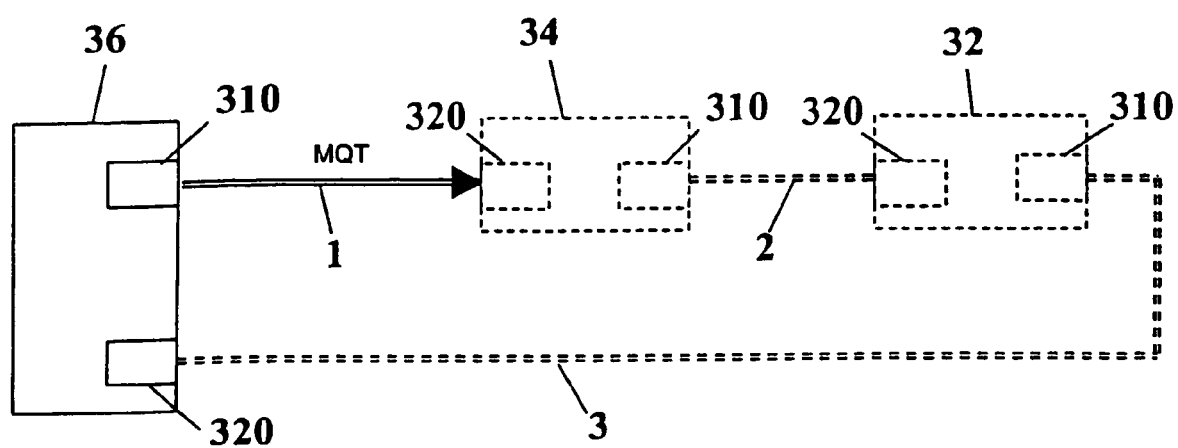
FIG. 8 illustrates the transmission of an exemplary master query telegram during an exemplary network discovery.
Figure 9:
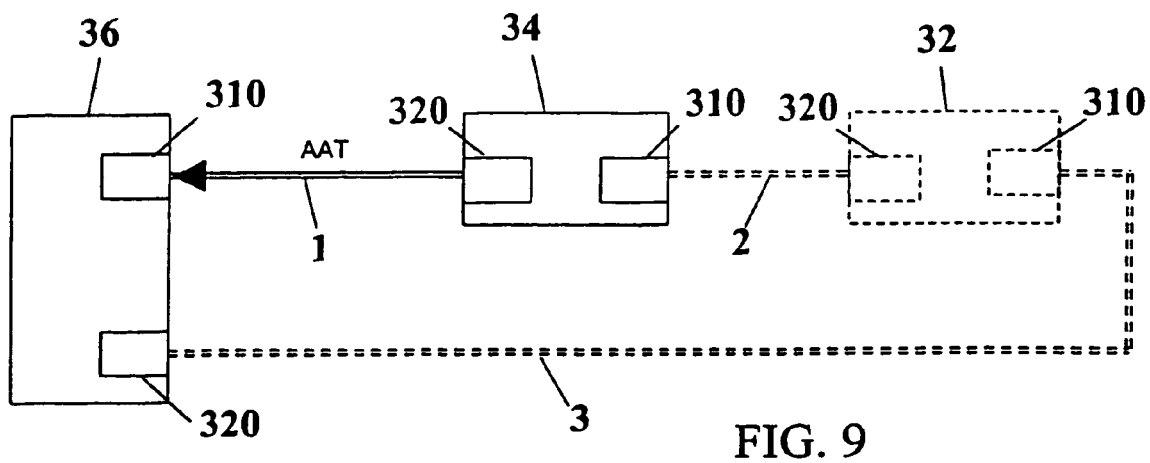
FIG. 9 illustrates the transmission of an exemplary answer telegram during an exemplary network discovery.

The discovery phase 60 always occurs prior to the operational phase 62, although an operational phase 62 can be interrupted to return the network to a discovery phase 60. Slave nodes are in the undiscovered state immediately following power-up. They can also be forced back into this state along path 600 by the master 36 sending out a hide packet (the MHT), after discovery of a fault, for example, at which time the slaves then propagate this packet throughout the network. A simple network ring 30 prior to the discovery process after power-up is illustrated in FIG. 7. At first the slaves 32 and 24 are undiscovered by the master 36 following power-up and are hence shown in dashed lines. In other words, the master 36 has not identified and/or enumerated the slaves 32 and 34. At this time, the master issues an MQT (master query telegram, illustrated in FIG. 8) from its P0 port over network link 1, as illustrated in FIG. 8. The first slave 34 in the network receives the MQT but, since slave 34 is undiscovered, slave 34 does not pass the MQT along. Instead, slave 34 replies with an AAT (amplifier answer telegram, illustrated in FIG. 9) that supplies the master 36 with certain information about the slave 34. This information is commonly the information that is required for operation of the network and would include, e.g., the number of slave addresses required by the node, the number and type of control entities, etc.

Figure 10:
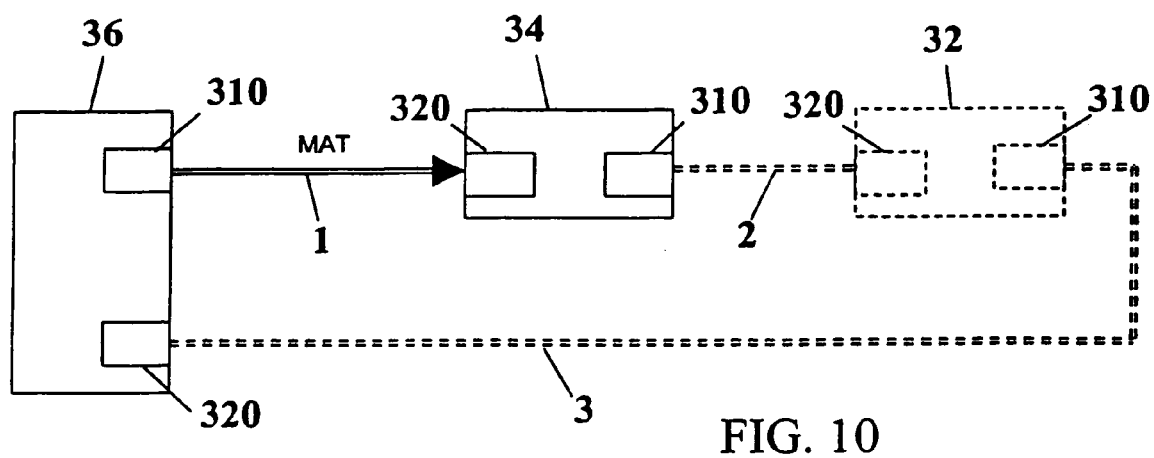
FIG. 10 illustrates the transmission of an exemplary master assignment telegram during an exemplary network discovery.
Figure 11:
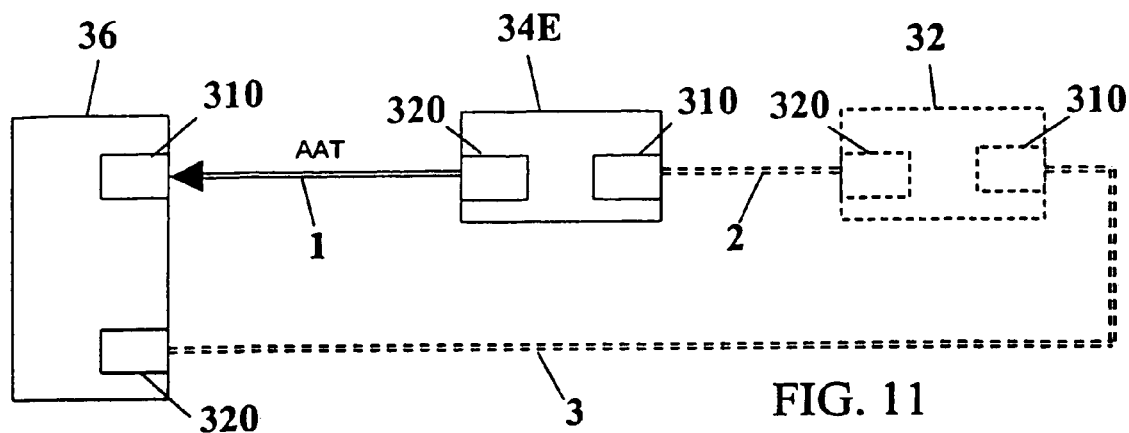
FIG. 11 illustrates the transmission of an exemplary second answer telegram during an exemplary network discovery.

The delay between the transmission of the MQT the master 36 and the reception of the AAT by the slave 34 is repeatable to an uncertainty associated with the physical layer clocks. Hence by timing the delay between transmission of the MQT and reception of the AAT and then subtracting the known internal delay of the slave 34 when transmitting the MQT, the propagation delay caused by the cabling and the repeaters in any intervening nodes may be computed by automated means. The known internal delay of the slave 34 has two elements. The first arises due to the FIFO's of the slave 34. This is a fixed quantity, dependent on depth. The second is the time taken for the node to automatically respond to the MQT with an AAT. This is a fixed number of clock cycles for fully synchronous circuitry. Thus, the sole elements of uncertainty are the resolution of the governing clocks (master and slave) and too a lesser degree the drift and accuracy thereof. Nevertheless, this known internal delay is then used to calculate a forward path time correction factor (FPTC) for the particular node (such as node 32 in FIG. 8 and 9). After a determination of the FPTC, the master then issues a MAT (master assignment telegram, as illustrated in FIG. 10) from its P0 port. The MAT thus assigns the lowest available network address to the slave 34 and sets the FPTC for slave 34. The slave 34 responds to the MAT with a further AAT (as illustrated in FIG. 11) to confirm that the address assigned by the MAT has been accepted by the slave 32. In FIG. 11 and in all further illustrations, slave 34 will be denoted as slave 34E to indicate that it has been enumerated.

Figure 12:
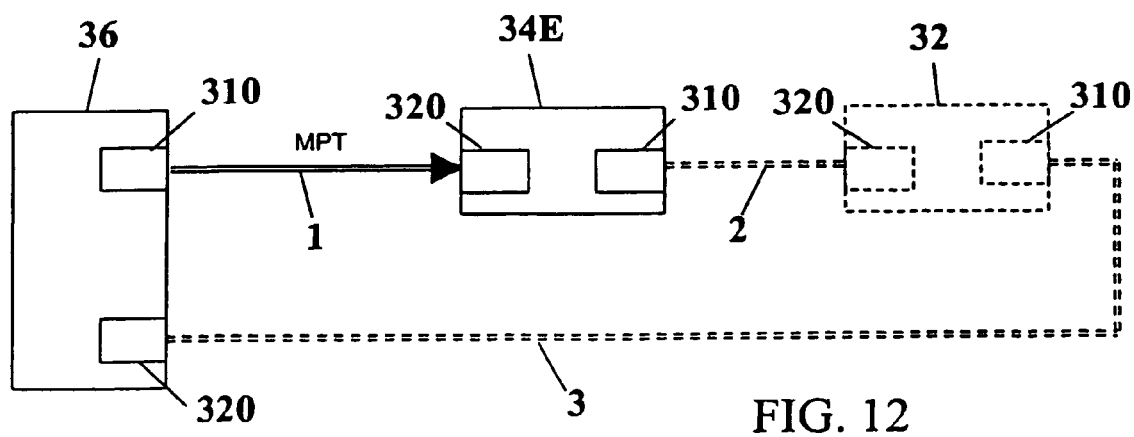
FIG. 12 illustrates the transmission of an exemplary port telegram during an exemplary network discovery.
Figure 13:
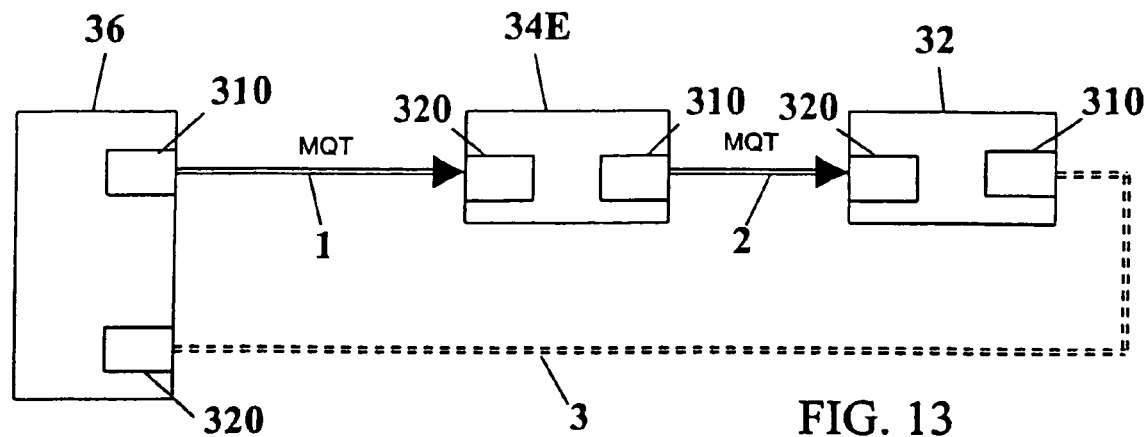
FIG. 13 illustrates accessing of the next node in the chain with a second master query telegram during an exemplary network discovery.

After enumeration of slave 34E, the master 36 issues an MPT (master port telegram, as illustrated in FIG. 12) from its P0 port that activates the P0 port on slave 34E. This causes slave 34E to relay messages though its internal FIFOs, and thus it becomes possible to discover and enumerate further nodes on the ring network such as slave 32. This discovery and enumeration process proceeds for slave 32 as it did for slave 34E. It should be noted that when the MQT is transmitted through slave 34E to slave 32 (as illustrated in FIG. 13), the FPTC will include the delay caused by the repeaters of slave 34E. In all further illustrations, slave 32 will be denoted as slave 32E to indicate that it has been enumerated. Naturally, the discovery, enumeration, and configuration can be extended to more slave nodes than herein illustrated. For the sake of brevity and clarity in the figures, further slave nodes have been omitted.

Figure 14:
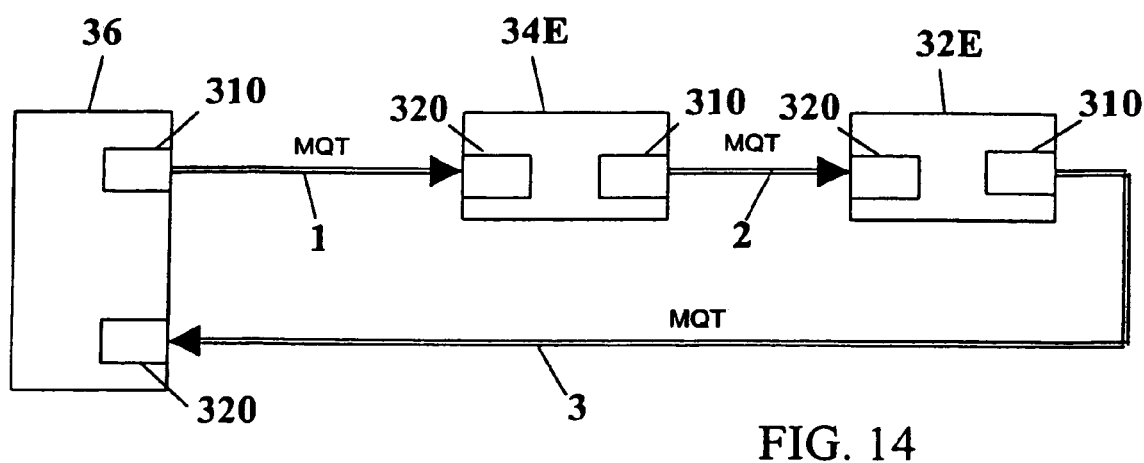
FIG. 14 illustrates an exemplary timing process for determining an outward ring delay during an exemplary network discovery.
Figure 15:
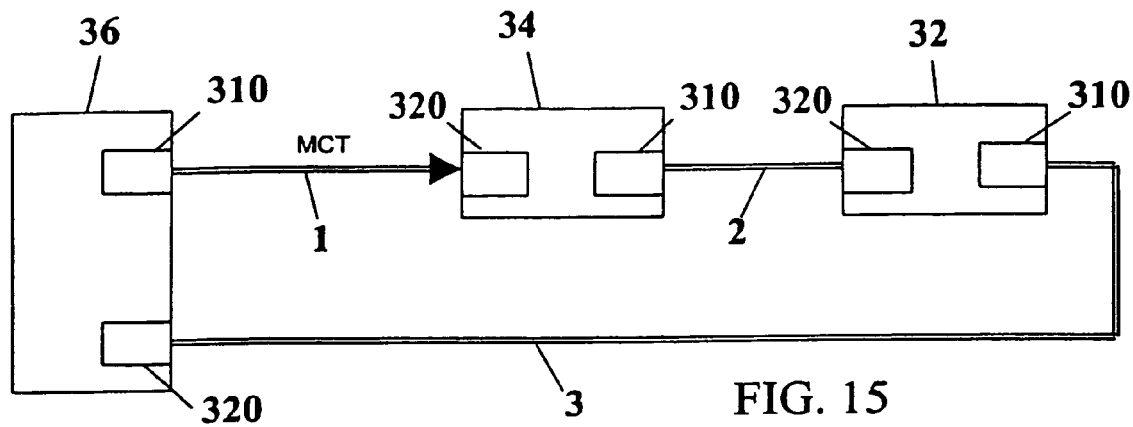
FIG. 15 illustrates an exemplary process of setting a RPTC of a first node during an exemplary network discovery.
Figure 16:
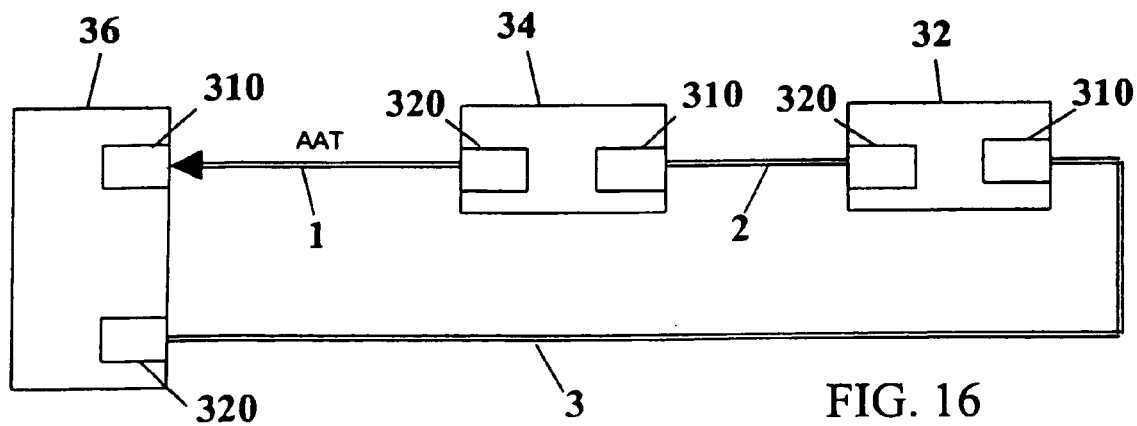
FIG. 16 illustrates an exemplary confirmation of an RPTC by a first node during an exemplary network discovery.

In one embodiment, when all of the slaves in the ring have been discovered, enumerated, and configured, it is determined if the ring is complete and the total time taken for the MQT to travel from the P0 port of the master 36 to Q port of the master 36 is measured (as illustrated in FIG. 14). The total delay time is then used by the master 36 to compute the delay of the return link 3. The master 36 can store the propagation delay to every node in the network, including the propagation delay of the final link 3. Armed with this information, the master 36 then computes the delay from the Q port of the master 36 to each node in the network. The delay from the Q port of the master 36 to each node is used to calculate the reverse path correction time (RPTC) in a manner similar to that described with regard to the FPCT. The master 36 can then assign the RPTC for each node to each node using the MCT (master configuration telegram) as illustrated in FIG. 15 with the address set to target a particular node, and receives answers confirming the assignment as illustrated in FIG. 16.

Figure 17:
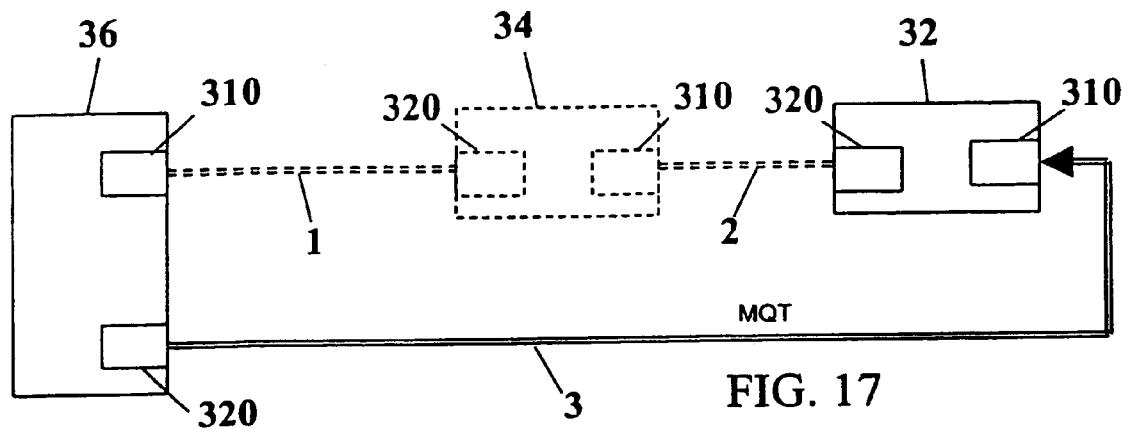
FIG. 17 illustrates the transmission of an exemplary master query telegram in the reverse direction during an exemplary network discovery.

In an alternative embodiment, the discovery, enumeration, and configuration process can be repeated by instructing all the nodes to hide using an MHT, and then repeating the above-described process using the Q port of the master 36. For example, the first step of this process would include transmitting a MQT from the Q port of the master 36 and (re)discovering node 34 as illustrated in FIG. 17. The propagation delays in the forward and reverse directions can be compared to help ensure the operability of the network and all of the slave node repeaters. Both the forward and reverse propagation delays can be stored, averaged, and/or combined as needed.

Figure 18:
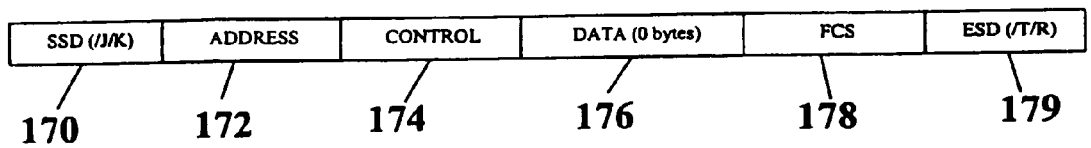

After the discovery phase 60 is complete, the network for motion control can then enter the operational phase 62. This can be indicated, for example, by transmission of a MST (master synchronization telegram) from the master 36 over the network. The principal purpose of the MST is to provide a timing reference for the slaves, and an example embodiment of one MST is illustrated in FIG. 18. Another way of indicating a timing reference to the slaves includes transmission of a MTT (master timing telegram), which indicates the equivalent of a MST in to some nodes in ring network topologies in the event of a severed link or similar network fault.

The MST illustrated in FIG. 18 includes an address field 172, a control field 174, a data field 176, and a FCS field 178. These fields correspond to the address field 42, a control field 43, a data field 44, and a frame check sequence 45 of FIG. 4, with the exceptions that the address field 172 indicates that the MST is to be "broadcast" (i.e., received and used by all slave nodes) and the data field 176 in the MST is empty. Rather than carry data, the MST simply indicates a common point in time which the slave nodes can use to synchronize their respective clocks in light of the FPTC (and/or RPTC) set during configuration.

In the embodiment of the operational phase 62 currently described, demands can be transmitted to exactly one slave using a MDT (master demand telegram). An exemplary MDT is illustrated in FIG. 19, where the address field 182 indicates a single slave node and the data field 176 includes run-time demands for the single slave node indicated in the address field 182. In an M-slave network, there are M possible addresses found in the address field 182, and each MDT can be designated as an MDT1, MDT2, or so forth for convenience sake. Naturally, a single MDT can be addressed to plural or even all slave nodes simultaneously, by, e.g., defining one or more further addresses to indicate the desired plurality of slave nodes.

Also in the operational phase, run-time data (e.g., the actuator and/or actuated object position for feedback control) can be returned to the master 36 from a slave node using an AT (slave telegram). An exemplary AT is illustrated in FIG. 20. These fields correspond to the fields of the exemplary telegram illustrated in FIG. 4, with the exception that the address field 192 indicates the address of the slave node that is the source of the AT. Moreover, the data field 196 can include both node statistics 1961 and application data 1962, where node statistics relate to network information (such as, e.g., indicating whether the last MST and MDT were received correctly), and the application data relates to the motion operations of the slave node. In a preferred embodiment, the AT retrieves run-time data from exactly one slave and thus, in an M-slave network, there are M possible addresses found in the address field 192, and each AT can be designated as an AT1, AT2, or so forth for convenience sake. Naturally, other AT's can include data from plural slave nodes in a system where one slave communicates with another or in a tree topology.

One exemplary message routing scheme during normal operation is illustrated in FIG. 21. In the illustrated example, outbound telegrams MST and MDT first proceed from the P0 port of the master 36 to the Q port of the slave 32. They are decoded by the dual PHY element, and transferred to the MAC of the slave 32. In telegrams that are "broadcast" (such as a MST), every MAC will use the telegram information. In telegrams that are addressed to a specific slave node (such as a MDT), only that slave node will act upon the information in the telegram. In a preferred embodiment, every telegram is routed around the entire ring network, with each slave node repeating every telegram. Therefore, the master will have its own outbound messages returned across the final link after the messages are received and repeated by all of the slaves. This allows the master 36 to confirm the continuity of the ring network.

An exemplary routing scheme for inbound (directed to the master 36) telegrams is illustrated in FIG. 22. In the illustrated example, inbound telegram AT is first transmitted from the Q port of a slave node to the previous node (either slave or master) in the network. Since the telegram will reach the master 36 prior to completing the entire network ring topology, in some embodiments a MTT (master tail telegram) is generated at the master and transmitted from the Q port of the master. This is done, e.g., to confirm a functional reverse path.

Naturally, other message routing schemes are possible in the current invention. For example, the direction of the routing (and the designations of the "previous slave node" and the "next slave node" are arbitrary). Message routing may also be changed in the operational phase in response to a fault in the network links and/or the slave nodes.

FIG. 23 illustrates a sample network with a ring topology with a fault between the slave nodes 32E and 34E. In the event that a link in the ring network is severed or faulty, it is possible to maintain full operation of the network by re-routing the messages. In this case, the network degenerates into a pair of chain topologies. As soon as the master 36 fails to receive return telegrams that have been transmitted along the entire ring (for example, an MDT sent from the P0 port of the master 36 is not returned to the Q port of the master 36), the master 36 can then transmit telegrams such as MST and the slave MDT's out of the Q port of the master 36. Depending upon the location of the fault, if any of the slave nodes receive the MST at their P0 ports rather than their Q port, these slaves are configured to send their reply telegrams (e.g., AT) through their P0 ports rather than their Q ports, as illustrated in FIG. 23. In this fashion, the network now automatically switches to an operational topology of two slender trees rather than a ring. Moreover, the existence and location of the fault can be determined by noting which slaves do not transmit telegrams to the P0 port of the master 36 (or conversely, which do transmit telegrams to the Q port of the master 36). Naturally, the telegrams received at both ports can be compared to determine if only a fault exists only at a single location. If the break in the network chain occurs at one of the links, then the broken ring network remains fully operational as two slender trees. In some applications, it may be prudent to bring the machine to a safe condition (e.g., halt actuator motion) and effect repairs immediately.

In order to accomplish accurate co-ordinated control across a network, it is necessary to have some form of a network timer system. A network timer system is also useful for the accurate scheduling of network traffic.

Coordinated multi-axis motions are complicated by the propagation delays of signals through the ring network topology. For example, reception of an outbound telegram (e.g., MST or MDT) at the slave nodes will be delayed by, e.g., propagation time through the cabling, the PHY's, and the MAC repeaters of prior slave nodes. Therefore, networks that are physically large or have many nodes on a ring (or have many tiers on their trees, as discussed herein later) experience the greatest delays. It is therefore desirable to introduce a correction factor to permit the simultaneous application of the demands to the drives and to receive simultaneously acquired feedback from the control entities throughout the network. The propagation delays are repeatable to a level of uncertainty set by the PHY clock rates and accuracy. As described above, the delays can be measured during the discovery phase. There are two main elements in the network timer system that can serve to compensate for these propagation delays. The first is the strictly periodic MST telegrams emitted by the master, while the second is the local time correction circuitry present on each slave.

In a first embodiment, the master transmits two different correction factors to each slave related to the time taken for a telegram sent from the master to reach the slave in the forward direction and in the reverse direction around the ring. These quantities are called the forward and reverse path time correction or FPTC and RPTC, and their transmission can be performed, e.g., using a MCT during the discovery phase 60.

During the operational phase 62, a MST is transmitted from the master 36 on a periodic basis. The MST is the synchronization signal for the operation of the motion control nodes on the network and, among other functions, the MST helps synchronize the acquisition of position data for each servo loop. Each node can phaselock an internal timer to the MST synchronization signal.

In one embodiment for operation with a complete network ring topology, since the MST is a continuously running master synchronization signal, each slave node can use its own FPTC as an offset when adjusting its internal timing. Thus, each node can be synchronized in time even when the FPTC is received at each node at different times. In effect, each node can anticipate receipt of the MST by the FPTC time interval. Thus, the internal timing of all of the nodes is based on simultaneous synchronization, and position sampling and motion demand occur simultaneously, which is vital for multi axis coordination. The same process can be used to offset the collection of data sent back to the master with the RPTC delay for the transmitting slave node.

A second embodiment for operation in the event of a network fault condition, the MST will be transmitted from both the P0 and the Q port of the master 36. In this case, unless the faulty link is immediately adjacent to the master 36, at least one slave node 36 will receive the MST at its P0 port rather than its Q port. As illustrated in FIG. 25, in the case of a break between Slave 32E and Slave 34E, the MST that is sent in the reverse direction is received by slaves 39E, 38E, and 34E. Thus, the FPTC is no longer appropriate for slaves 39E, 38E, and 34E, and those slaves must instead use the RPTC.

The benefit derived from the timing correction can be shown in the context of one embodiment of the invention illustrated in FIG. 26. The network controller (master 36) contains the motion planning function, a digital processor, which typically implements the position loop, as well as other filtering and control functions. The network nodes (slaves 32E and 34E) contain the motor drive(s), the position feedback interface, and the motion related I/O interfaces. The motion control network nodes can also include a processor that implements the current/torque control loop. Both the slave nodes 32E and 34E and the master 36 will have a network interface.

As can be seen, all of the drive, motor, position feedback, and I/O signals connect to the nodes. These nodes can be placed in close proximity to the motors and sensors. The wiring to these nodes can be kept short. The network cable connects all of the nodes to the master with one thin cable. The speed and deterministic nature of the novel network allow for centralized software control of all of the nodes and hence all of the axes in the motion control system. Yet the wiring is minimal compared to prior art unnetworked systems.

During the operational phase, a timing diagram such as that found in FIG. 27 can be used to illustrate the operation of a network such as that illustrated in FIG. 26. A MST can be periodically transmitted by the master 36 to synchronize the slave nodes of the motion control system with the servo cycle clock (or a frequency related to the servo cycle clock). The actual network transfer rate is many times faster than the frequency of the MST signal because much information must be transferred in each cycle. However, all network operations can be phase locked to the MST signal. In one embodiment, the rate at which position is updated in a motion control system is the servo cycle clock rate. The motion trajectory for each axis is determined by the motion planning function of the master 36, and at each tick of the servo clock the next position demand, representing the next point on the motion trajectory, is presented to the drive at a slave node.

Although, in complex servo systems, many functions may be performed in each cycle of the synchronization clock, a minimum of three operations must take place in each cycle. Firstly, the position of the actuator and/or actuated object must be acquired. Secondly, this position data must be transferred to the master 36. Thirdly, the velocity or torque or current demands (based in whole or in part upon a feedback signal calculated based on this or a previous clock cycle's position data) must be applied to the drive. In a centralized motion control system, these functions are synchronized to each tick of the servo clock for each axis. This allows highly coordinated, multi-axis motion that is controlled by a centralized motion control system.

Referring in particular to the timing diagram of FIG. 27, the acquisition of position data at the slave nodes 32E and 34E for transmittal back to the master control processor 36 is shown.

As illustrated, position data can be acquired simultaneously on two nodes using the time correction function of the invention. As shown in FIG. 26 for a two node system, the reception of the servo clock signal at slave node 34E is delayed by an amount of time FPTC 1 and the reception of the servo clock signal at slave node 32E is delayed by FPTC 2. These delay times correspond to the propagation delay times for information passed from the master 36 to slave 34E and slave 32E, respectively. Thus, the reception of the servo clock signal at each slave node is at the same frequency as the servo clock of the master 36, but offset in time. Since the respective FPTC has been previously stored in each slave node according to this embodiment of the invention, each node acquires the next position update at the same real time (but at different times relative to the reception of the MST by that slave node).

The actuation of a velocity or torque or current demand by the drives at each slave node is similarly accomplished (i.e., delayed by the suitable FPTC). Thus, it can be seen that the novel network retains centralized motion planning and position control while achieving absolute synchronization with the servo clock of the master 36.

In addition to timing the activities that occur at the slave nodes, the transmission of telegrams along the loop network must also be scheduled in the operational phase 62, e.g., to prevent telegram overlap. (During the exemplary discovery phase 60 described above, scheduling of messages is not a problem since the network is self-timed. The master 36 transmits a message at any time and the slaves respond thereto shortly afterwards).

During the operational phase 62 all messages are sent on a cyclic basis. In one embodiment, the master 36 transmits the MST on a periodic basis, and the MTT and the MDT's are sent at pre-defined offsets with respect to the start of the MST period. The slaves use their time-corrected local clock to emit their AT's at an offset determined and loaded into the slave during the discovery phase 60.

Two exemplary scheduling schemes during the operational phase 62 are now described, namely strict timing and free timing. Scheduling is commonly determined by the master 36 and can be accomplished by setting the timing parameters implemented in the slave nodes during the discovery phase using, e.g., MCTs addressed to the individual slave nodes.

Free timing allows telegrams to be transmitted from a particular slave node at a particular time relative to the MST synchronization signal. The telegrams can be transmitted in any predetermined order as long as they are separated from one another by a sufficient "gap" (distance in time). With the system illustrated in FIG. 28, an example AT order could be AT4, gap, AT1, gap, AT3, gap, and AT2. The gap can be selected so that the telegrams can travel in either direction around the ring without collision.

The absolute minimum gap in any timing scheme is stipulated by the PHY devices (e.g., at least four IDLE symbols) to ensure, firstly, the synchronization of the phase-lock loop timer within the PHY with the MST and, secondly, to allow time for the re-synchronization of the scrambler within the PHY. In free timing, this gap must be respected under all conditions and commonly includes allowing for clock rate differences between nodes the propagation time across the network (including all cabling and repeaters) from the farthest node. If the propagation time is large enough and in the absence of this allowance, the head of AT4 could collide with the tail of AT1.

Strict timing organizes the transmission times for the ATs to achieve the most efficient bandwidth utilization. In a simple ring network, the nodes send their ATs at a time that has been scheduled to follow (after a suitable time gap for the PHY) after the AT from the previous node has been transmitted to the master 36. The ATs are thus transmitted in order, the node whose Q port is connected to the P0 port of the master sends first and then indicates this transmission to the next node, and the second node then transmits to the master 36 second, and so forth; in FIG. 22 this corresponds to 34E followed by 32E. Thus AT1 is sent first, followed by AT2, and so on. By using the above-described strict timing approach, the minimum gap between telegrams stipulated by the PHY devices is respected and collisions are inherently avoided. However, in the presence of a fault condition, the direction of the AT messages around the ring will be reversed for at least some of the slave nodes and the transmission times set by the strict timing regime are not guaranteed to respect the proper inter-message timing gaps.

An alternate network topology is a full-duplex tree, as illustrated in FIG. 29. A full-duplex tree can be used where ring wiring is inconvenient or where a machine has an inherently modular structure and it is an advantage to attach a pre-wired sub-system without disturbing the existing network wiring. Since a tree lends itself to machinery that is modular, each module can be pre-wired and the modules can be added to a machine without disturbing the existing wiring.

In order to implement a tree, a slave node will, in the general case, have in addition to the P0 port, other ports designated P1, P2, . . . PN (310, 311). Each PN port will have a pair of FIFOs to allow it to repeat transmissions to and from the Q port (320).

In a preferred embodiment of the tree structure, a message received at a slave node PHY from the Q port is repeated to each of the ports P0, P1, P2 . . . PN, whereas a message received at the slave node PHY from any PN port is only repeated through the PHY to the Q port. The repeater function is thus bi-directional but messages sent from the master fan-out throughout the tree whereas messages sent from a slave pass back to the master but, for simplicity's sake, do not fan out to the other slaves. Each link of the tree structure runs from a PN connector to a Q connector and there are no fundamental limitations on the number of PN connectors, i.e. the fan-out or on the number of tiers to the tree. In practice, however, both fan-out and tree depth will be limited by economic concerns.

In a tree structure it may be of practical benefit in some embodiments to have a slave node whose sole function is to increase the fan-out so as to reduce the depth of the tree, such a slave node could be arranged to have no control entities and need not support an address. In this case, such a slave node would act as a repeating hub.

The discovery process in a tree is the same as for a ring but with certain minor changes. The discovery process now fans out from each slave node to as many other slave nodes as are attached. The MPT controls which of the PN ports of a given slave is active and thus allows selective configuration of the network tree, one node at a time.

Both strict and free timing as described above are applicable to a tree. The strict timing scheme is however somewhat different in a tree network; the AT's from the first tier (i.e. nearest the master) are sent sequentially and without overlap (at times set during the configuration phase by the master 36), and then those from the second tier, and so forth.

The reader will see that a network according to the present invention links the elements of a motion control system that preserves the flexibility of the established centralized control model with all of the benefits associated with networked connectivity that is applicable to the multi-axis control system of machines of the highest performance level and largest physical size.

While the above description contains many specific details for implementing such a network, these details should not be construed as limitations on the scope of the invention, but rather as an exemplification thereof. Many other variations thereof are possible as obvious to one skilled in the art.

For example, a network according to the present invention could support any of three techniques for time correction: no correction, static correction and measured correction. Measured correction is the preferred technique described above, but an alternative that is simpler and less expensive to realize is static correction. Static correction is achieved by predetermining the delay of a given node and of the cable leading to the node. The master node is then able to assign the slave a correction factor without any operational confirmation of this value. Correction factors for nodes father along the ring or tree are cumulative. The static correction data could be a data sheet figure for the slave node or could be a calibrated value read previously measured for each device and read over the network. Moreover, in small networks, time correction could be dispensed with altogether.

Although the network may be configured so that the instant at which the MST leaves the master is aligned with the servo tick which in turn is aligned with the instant at which the slave nodes acquire position or other data and which in turn is also aligned with the instant at which slave nodes give effect to new demand values, it is to be understood that these instants, while still simultaneous for all slaves, could be separated by specified timing offsets and that this may be of practical advantage.

Subtracting the forward (or reverse) time correction parameters from the time of reception of the MST is only one way of achieving a corrected timer within the slave. Alternatively, the same effect can be achieved using a phase-locked loop. In such a scheme, a "true local MST pulse" is generated by phase comparison between the "true local MST pulse" and the received MST delayed by the cycle time less the FPTC.

The preferred embodiment includes the discovery phase as described above. However, the network could alternatively—but far less conveniently—be implemented without the discovery phase through the static assignment of node addresses and timing parameters using DIP switches or other non-volatile memory in conjunction with a setting tool.

Moreover, it is possible to combine the functions of the exemplary telegrams described above. For example, the data field within the MST could be modified to contain useful information. As another example, the MDT's described above carry data to one slave address. Alternatively, it is possible to use a single MDT and arrange for the operational data for all the slaves to be contained within this single MDT telegram.

In the above-described description, each control entity within a single physical slave node has a separate node address. Alternatively, where more than one control entity exists at a physical node, it is possible, in terms of both circuitry and network utilization, to send all of the command data in a single message for that node rather than as four separately addressed MDT's. Similarly, all feedback information can be bundled into a single AT.

In a previously described embodiment, the node statistics field is reserved for the purpose of indicating whether the last MST and MDT were received correctly and other network information. Alternatively, the node statistics field could be located elsewhere in the AT or in a freestanding telegram devised for this purpose. Alternatively, the node statistics field can be omitted altogether.

The particular routing of messages in the tree topology previously described has been selected for its simplicity.

Alternatively, the AT messages could be reflected to all nodes. It is also possible to have the messages circulate as on a ring, i.e. pass in and out of every node, even though the topology is a tree.

Naturally, the network can be based on a physical layer other than IEEE 802.3-1998 Clauses 24-26, since there are no special requirements on the physical layer. Any such layer supporting point-to-point communication, full or half-duplex (since full-duplex can be achieved using two half-duplex links), having a high bit-rate, a low inherent error rate, and good EMC properties could be used. One example of a physical layer that can be used is the IEEE 802.3ab-1999 ('Gigabit Ethernet over copper').

Various forms of computer readable media may be involved in storing instructions for carrying out one or more sequences described herein. For example, the instructions may initially be carried on a magnetic disk that can be inserted into the master 36. The master 36 can then load the instructions for implementing all or a portion of the present invention. Common forms of computer readable media include, for example, hard disks, floppy disks, tape, magneto-optical disks, PROMs (EPROM, EEPROM, Flash EPROM), DRAM, SRAM, SDRAM, or any other magnetic medium, analog or digital signals transmitted over a network connection, compact disks (e.g., CD-ROM), or any other optical medium, punch cards, paper tape, or other physical medium with patterns of holes, a carrier wave, or any other medium from which a computer can read.

Briefly recapitulating, a system for motion control, a method of using a system for motion control, and a computer readable medium storing instructions for operating a system for motion control according to the present invention provide a correction mechanism to account for propagation delay. This system for motion control can include full-duplex operation and/or strictly cyclic messaging. This system for motion control can also provide a bit rate that is high enough to update the torque/current demands of several drives at rates of 16 kHz or more. Moreover, this system for motion control can provide a choice between ring or tree topologies, and between fiber or copper transmission media (or combinations thereof), and/or be inexpensive to implement and electromagnetically compatible with different motion devices (e.g., robust and able to operate over large ground potential differences). Moreover, this system for motion control can provide automatic system configuration capabilities, automatic location of network faults, simultaneous application of demands at multiple drives, simultaneous acquisition of the data from multiple drives throughout the system, and/or the ability (in a ring-connected network) to operate fully in the event of a severed link or similar fault.

Obviously, numerous modifications and variations of the present invention are possible in light of the above teachings. It is therefore to be understood that within the scope of the appended claims, the invention may be practiced otherwise as specifically described herein.

What is Claimed as New and Desired to be Secured by Letters Patent of the United States is :

1. A method of maintaining operation in the event of a fault of a system for motion control with a plurality of slaves in a ring network controlled by a central controller, comprising:
    transmitting first messages addressed to plural respective slaves in a first direction along said ring network;
    monitoring first reply messages transmitted by said plural slaves in a second direction along said ring network in response to the transmitted first messages;
    identifying, when first reply messages are not received from each slave to which a first message was transmitted, a first subset of slaves from which said first reply messages are received, and based thereon, determining a second subset of slaves exclusive of said first subset of slaves, from which respective first reply messages were not received;
    transmitting in said second direction, when first reply messages are not received from each slave to which a first message was transmitted, second messages addressed to respective slaves in said second subset of slaves; receiving second reply messages transmitted by respective of said slaves of said second subset of slaves in response to said second messages, said second reply messages traveling in said first direction along said ring network;
    transmitting in said first direction third messages addressed to said first subset of slaves; and
    transmitting in said second direction fourth messages addressed to said second subset of slaves.

2. The method according to claim 1, wherein said ring network comprises a full-duplex ring network.

3. The method according to claim 2, further comprising:
    a step of reenumerating, from each of two ports of the central controller, two fragments of a ring that remain connected to the central controller when one or more links of the full-duplex ring network no longer function or have been removed; and
    a step of operating the two fragments as two networks each having a tree topology.

4. A system for operating a plurality of slaves controlled by a central controller via a ring network in the event of a fault, comprising:
    means for transmitting first messages addressed to plural respective slaves in a first direction along said ring network;
    means for monitoring first reply messages transmitted by said plural slaves in a second direction along said ring network in response to the first messages transmitted by said means for transmitting first messages;
    means for identifying, when first reply messages are not received from each slave to which a first message was transmitted, a first subset of slaves from which said first reply messages are received, and, based thereon, for determining a second subset of slaves exclusive of said first subset of slaves, from which respective first reply messages were not received;
    means for transmitting in said second direction, when first reply messages are not received from each slave to which a first message was transmitted, second messages addressed to respective slaves in said second subset of slaves; and
    means for receiving second reply messages transmitted by respective of said slaves of said second subset of slaves in response to said second messages transmitted by said means for transmitting in said second direction, said second reply messages traveling in said first direction along said ring network.

* * * * *